United States Patent [19]
Chang et al.

[11] Patent Number: 5,634,015
[45] Date of Patent: May 27, 1997

[54] GENERIC HIGH BANDWIDTH ADAPTER PROVIDING DATA COMMUNICATIONS BETWEEN DIVERSE COMMUNICATION NETWORKS AND COMPUTER SYSTEM

[75] Inventors: Paul Chang, Peekskill; Gary S. Delp, Yorktown Heights; Hanafy E.-S. Meleis, Yorktown Heights; Rafael M. Montalvo, Yorktown Heights; David I. Seidman, New York; Ahmed N.-E.-D. Tantawy, Yorktown Heights; Dominick A. Zumbo, White Plains, all of N.Y.

[73] Assignee: IBM Corporation, Armonk, N.Y.

[21] Appl. No.: 317,894

[22] Filed: Oct. 4, 1994

Related U.S. Application Data

[62] Division of Ser. No. 651,894, Feb. 6, 1991, Pat. No. 5,367,643.
[51] Int. Cl.$^6$ ............................................. G06F 13/00
[52] U.S. Cl. ............... 395/309; 364/927.92; 364/927.93; 364/927.96; 364/940; 364/940.61; 364/DIG. 2; 370/402; 370/412; 395/800
[58] Field of Search ................ 370/85.1–85.15; 395/250, 325, 500, 600, 800, 309; 371/32

[56] References Cited

U.S. PATENT DOCUMENTS

| | | | |
|---|---|---|---|
| 5,043,981 | 8/1991 | Firoozmand et al. | 370/85.1 |
| 5,153,884 | 10/1992 | Lucak et al. | 371/32 |
| 5,187,780 | 2/1993 | Clark et al. | 395/325 |
| 5,193,149 | 3/1993 | Awiszio et al. | 395/200 |
| 5,247,626 | 9/1993 | Firoozmand et al. | 395/250 |
| 5,367,643 | 11/1994 | Chang et al. | 395/325 |

OTHER PUBLICATIONS

"Five Chip Token–Passing Set Operates LANs At 100 Mbit/s" By Nicolas Mikhoff, Electronic Design, v35, p. 45(5), Sep. 17, 1987.

"VLSI Ethernet Controller Targets Future LANs"; Leonard Milt, Electronic Design, v38, n2, p. 105(3); Jan. 25, 1990.

*Primary Examiner*—Thomas G. Black
*Assistant Examiner*—Hosain T. Alam
*Attorney, Agent, or Firm*—Scully, Scott, Murphy and Presser

[57] ABSTRACT

A generic high bandwidth adapter providing a unified architecture for data communications between buses, channels, processors, switch fabrics and/or communication networks. Data is carried by data stream packets of variable lengths, and each packet includes a header control information portion required by communication protocols used to mediate the information exchange, and normally a data portion for the data which is to be communicated. A packet memory stores data packets arriving at a plurality of generic adapter input/output ports. The packet memory is segmented into a plurality of buffers, and each data packet is stored in one or more buffers as required by the length thereof. A generic adapter manager is provided for performing and synchronizing generic adapter management functions, including implementing data structures in the packet memory by organizing data packets in buffers, and organizing data packets into queues for processing by the processor subsystem or transfer to or from generic adapter input/output ports. The generic adapter manager prepares future response to anticipated requests for communications services which are functions of the current requests for communication services, such as preparing a response for an anticipated request for a next buffer by a current request for a receipt of data. The generic adapter manager stores the future responses at specified addresses in memory which can be read by a requester. Each generic adapter input/output port has associated therewith a packet memory interface providing for the transfer of data packets into and out of the packet memory, such that when a data packet is received at an input/output port, the data packet is transferred into the adapter packet memory and queued for processing.

19 Claims, 7 Drawing Sheets

| ADDRESS LINES<br>25 24 23 22 21 20 19 18 | FUNCTION |
|---|---|
| 0 0 — — — — — — | MICROPROCESSOR ADDRESS SPACE |
| 0 1 0 — — — — — | UNUSED ADDRESS RANGE (PM CONTROL) |
| 0 1 1 — — — — — | GAM ADDRESSING |
| 1 0 — — — — — — | PACKET MEMORY ADDRESSING |
| 1 1 0 PMI-ID 0 0 | PMI ADAPTOR ASYNCHRONOUS INTERFACE |
| 1 1 0 PMI-ID 0 1 | PMI ADAPTOR SYNCHRONOUS INTERFACE |
| 1 1 0 PMI-ID 1 0 | PMI GENERIC INTERNAL REGISTERS |
| 1 1 0 PMI-ID 1 1 | PMI COMMUNICATIONS FRONT END REGISTERS |
| 1 1 1 — — — — — | GAM ADDRESSING |

| QUEUE STATUS REGISTER | SERVICE CHANNELS | | | | | | | |
|---|---|---|---|---|---|---|---|---|
| | 0 | 1 | 2 | 3 | 4 | 5 | 6 | 7 |
| 0 | 1 | 0 | 0 | 0 | 0 | 0 | 0 | 0 |
| 1 | 0 | 1 | 1 | 0 | 0 | 0 | 0 | 0 |
| 2 | 0 | 0 | 0 | 0 | 0 | 0 | 0 | 0 |
| 3 | 0 | 0 | 0 | 1 | 1 | 0 | 0 | 0 |
| 4 | 0 | 0 | 0 | 0 | 0 | 0 | 0 | 0 |
| . | . | . | . | . | . | . | . | . |
| . | . | . | . | . | . | . | . | . |
| . | . | . | . | . | . | . | . | . |
| N | 0 | 0 | 0 | 0 | 0 | 1 | 1 | 1 |

GENERIC HIGH BANDWIDTH ADAPTER PROVIDING DATA COMMUNICATIONS BETWEEN DIVERSE COMMUNICATION NETWORKS AND COMPUTER SYSTEM

This is a divisional of application Ser. No. 651,894, filed on Feb. 6,1991, which is now issued U.S. Pat. No. 5,367,643.

BACKGROUND OF THE INVENTION

1. Field of the Invention

The present invention relates generally to a hardware/software construct which converts data flow on one medium to data flow compatible to another medium. More specifically, the generic high bandwidth adapter of the present invention provides a data interface between system buses, switching fabrics, transmission media, and a variety of Local Area Networks (LANs).

2. Discussion of the Prior Art

In the prior art, communication adapter technology has enjoyed a speed advantage over available transmission technology. Recent advances in transmission technology have broken this balance, leaving the communicator with excessive capabilities. With communication rates approaching or exceeding computation rates, it has been necessary to explore alternate communication architectures. This exploration has concentrated on the two areas of new protocols and optimal implementation of existing protocols.

The progress in transmission technology has provided not only much higher data rates but also much lower error rates. Existing communication protocols were designed assuming high media error rates and data rates much lower than computational speed. An enormous emphasis was placed on providing error recovery capability to avoid excessive use of the slow transmission media. As the basic assumptions have become progressively less true, existing communication protocols have become increasingly unsuitable for new transmission media. Another contribution to the mismatch of transmission capabilities and protocols comes from the fact that many existing communication protocols were designed for "general purpose processor/software" implementations. The "software oriented" design approach of these protocols has made communication protocol processors the bottleneck in data transmission.

To correct these known design deficiencies in existing communication protocols, several new fast lightweight protocols have been proposed. Compared with existing communication protocols, these protocols emphasize high data throughput and de-emphasize complicated error recovery schemes. In addition, most of these new lightweight protocols are designed with VLSI hardware implementations in mind.

In addition to the design deficiencies mentioned above, the data throughput of existing communication protocols is further hampered by another deficiency in many current protocol implementations. This implementation deficiency is the worst case (or penalize everyone) design principle, which specifies that all packets are to be treated equally. This treatment is without regard to the behavior of the packet. A packet which is in sequence and without error traverses much the same software path as the out-of-sequence or corrupted packet. This design principle was justified in a low transmission rate, lossy network, due to high error rates and minimal impact of software path lengths on communication latency. However, with the very low error rates of current transmission technologies, the probability of good-behavior packets is significantly increased and the potential packet arrival rate is greatly increased. Protocol implementations must be adjusted accordingly.

The activities in this area have been mainly the modification of current protocol implementations, rewarding good-behavior packets and penalizing only the bad-behavior packets. Implementation schemes have also included the pipelining of packet operations and hardware functional assists.

This throughput problem becomes even more complicated for a high-speed communication adapter due to the following additional constraints:

Compatibility with Existing Protocols & Implementations.

A high-speed communication adapter is expected to support new communication technologies and provide downward compatibility to existing communication technologies. Downward compatibility means not only supporting existing communication protocols, but also possibly supporting the methods or architectures with which existing protocols have been implemented.

Compatibility with Established System Buses and/or Channels.

More often than not, a communication adapter will act as a communication front-end for a host system. That means that most of the adapter packet data will either come from or go to an attached host system through an established system bus or I/O channel. From the point of view of end-to-end performance, the data transfer between an adapter and its attached host system is as important as, if not more important than, any other segment of the communication path between two end-nodes. A high-speed communication adapter is expected to support high data transfers on a family of long-established system buses and I/O channels and still be able to abide by the architectural rules of those buses and channels.

SUMMARY OF THE INVENTION

Accordingly, it is a primary object of the present invention to provide a novel architecture which has the potential to support a family of future communication adapters. These adaptors should be able to both satisfy the existing constraints and provide high data throughput with reduced host load. The adapter architecture described herein is generic because it provides a uniform interface to its adapter ports regardless of whether the adapter port is attached to a system bus, an I/O channel, a switching fabric, or a communication network.

In addition, this adapter architecture can support high data rates because it embodies several key design principles for high-speed protocols: hardware assist for repetitive communication functions, hardware assist for buffer, packet, and queue management, and optimal design for good-behavior packets with provision for abnormal bad-behavior packets processing.

A very significant feature of this adapter architecture is that it is feasible to implement. Throughout the course of the architecture definition process, careful consideration has been paid to ensure that the implementation of the generic high bandwidth adapter architecture is feasible with existing internal VLSI technologies.

A further object of the subject invention is the provision of a generic high bandwidth architecture which recognizes the fact that data communication often takes the form of data packets, and accordingly the generic high bandwidth adapter supports tile manipulation of data packets as an architectural primitive. The functional goals of this architecture include:

Provision for the high speed transport of packets into, through, and out of the generic high bandwidth adapter.

Hardware assist for buffer and queue management and data movement.

Support for multiple priority levels and types of services.

Provision of a uniform buffer/packet/queue/server management scheme over a wide range of bus and transmission technologies.

The support of high sustained throughput.

Possibility of very low host load for communications due to the provision of a high level software interface.

The support of multiple concurrent protocol stacks.

Provision for fast prototyping of new packet-based transmission technologies.

The generic high bandwidth adapter has been constructed to provide support for a variety of system interconnects. Some of the possible interconnects include:

Micro Channel 800 Mbps (Streaming Mode)

Cross Bar Switch—Very Low Latency 240 Mbps/port.

Serial I/O Channel 200 Mbps.

SPD Bus 80 Mbps.

370 Channel OEMI 24 Mbps.

The structure of the generic high bandwidth adapter is such that packet oriented transmission technologies are very easy to support. The following transmission technologies may easily be incorporated into a generic high bandwidth adapter, or will be incorporated in the near future:

Hardware Data Link Control 400 Mbps.

FDDI ANSI Standard Fiber Token Ring 100 Mbps.

DS3 (Clear Channel T3) 45 Mbps.

Token Ring 16/4 Mbps.

Ethernet 10 Mbps.

The generic high bandwidth adapter provides parallel mechanisms for the support of several protocols. The on-board processor is available for the implementation of the policy of Link, Network, and Transport level protocols. The following is a list of protocols which are candidates for support by the generic high bandwidth adapter:

APPN/SNA.

APPC.

TCP/IP.

SO/TP & SO/IP.

Broadband ISDN.

Portions of VTAM Support.

In accordance with the teachings herein, the present invention concerns a generic high bandwidth adapter providing a unified architecture for data communications between buses, channels, processors, switch fabrics and/or communication networks in which data is carried by data stream packets of variable lengths. Each packet includes a header control information portion required by communication protocols used to mediate the information exchange, and possibly a data portion for the data which is to be communicated. The generic high bandwidth adapter comprises a processor subsystem including a processor for processing the header control information portions of data packets. The processor has access to data packets stored in a packet memory which stores data packets arriving at one or more generic adapter input/output ports. The packet memory is segmented into a plurality of buffers, and each data packet is stored in one or more buffers as required by the length thereof. A generic adapter manager is provided for performing and synchronizing generic adapter management functions, including implementing data structures in the packet memory by organizing data packets in buffers, and organizing data packets into queues for processing by the processor subsystem or transfer to or from generic adapter input/output ports. Each generic adapter input/output port has associated therewith a packet memory interface providing for the transfer of data packets into and out of the packet memory, such that when a data packet is received at an input/output port, the data packet is transferred into the adapter packet memory and queued for processing.

In greater detail, a generic adapter bus is provided for connecting together the processor subsystem, the packet memory, the generic adapter manager, and the generic adaptor input/output ports. The processor subsystem includes a local memory containing communication code and code immediate control data, and a local bus interconnects the processor and the local memory. The processor subsystem. Further includes auxiliary circuits required for processor operations such as hardware timers, an interrupt controller, and a local memory controller. Isolation of the generic adapter bus from the processor subsystem data and address bus is provided to allow communication code to be processed largely in parallel with packet data movement. Provision is made for the connection of these buses when needed through the use of an isolator. A second isolator is provided for selective access to the GAM and its local memory.

The generic adapter manager also includes a local memory in which data structures are stored and used to organize data packets in buffers and packets into queues, and a local bus for coupling the generic adapter manager to the local memory. The generic adapter manager further includes a generic adapter manager kernel for implementing data structures involving buffers, packets and queues in the packet memory, an arbiter for the generic adapter bus for granting bus control to a bus requester with the highest bus priority or on a round robin basis, and a monitor for monitoring the generic adapter bus for parity checks and for checking the bus cycle length of time after bus control is granted to a bus requester.

The packet memory controller interfaces between the GAB entities and the PM. It provides error correction to and from the RAM and parity to and from the GAB. Single cycle and fast-page-modecycle access are provided. If DRAM is used, the PMC will provide memory refresh cycles.

Each packet memory interface contains provision for obtaining buffers from the generic adapter manager for storing arriving data packets in the packet memory, and also for reading out data packets from the packet memory and passing the data packets to its associated input/output port. Each packet memory interface further includes speed-matching/staging buffers to allow the interconnection of attachments to input/output ports having different data transmission rates.

A status notification arrangement is used to notify the packet memory interfaces of the existence of data packets in at least one of the queues forming their respective queue sets. It is comprised of a status register, wherein each bit therein corresponds to a queue and indicates whether that queue is empty, with a state change of the status register being broadcast over the generic adapter bus to all packet memory interfaces.

The generic adapter manager organizes packets into queues, with each queue comprising a linked list of data packets having a given priority level and destined for the same input/output port, or to be processed in a similar manner by the processor subsystem. The generic adapter manager defines a queue set for each input/output port, which comprises a group of queues which can be treated collectively as one operand for a given queue set operation. The packet memory includes a plurality of queues for the processor and a plurality of output queues for the packet memory interfaces. Data packets are usually discarded from output queues after they are transmitted from the packet memory, but a data packet or group of data packets can be designated as circulating, in which case the data packet or group of data packets are not discarded but are again queued after transmission.

Moreover, tile buffers can be linked to more than one data packet, as when attaching identical header control information portions to several data packets. The data portions of data packets can also be linked to different header control information portions, without duplicating or erasing the data portions until the last data packet using a data portion is transmitted.

Each input/output port examines the contents of incoming data packets and determines-the proper queue to which that data packet should be enqueued. This feature allows the generic high bandwidth adapter to be used as a multi-condition data packet switching system.

A queue reconfiguration mechanism is provided to switch queueing from an original queue to an alternate queue by allocating a new base address to the original queue, such that incoming data packets are linked to an alternate queue without a requirement to notify the sources of the data packets.

A queue reconfiguration mechanism is provided in which each packet memory interface can take over the service of a queue by having the queue set base address of the new packet memory interface set to the set base address of the old packet memory interface. A queue reconfiguration mechanism is also provided wherein a queue may be moved in bulk to be serviced by another packet memory interface by moving the first packet of an old queue to a new queue.

In accordance with the teachings herein, the subject invention provides a generic high bandwidth adapter for users of services, wherein each user of services sends a current request for services to a manager, with the current request defining a specified address in memory of the manager. The manager has previously prepared responses to anticipated requests for services and stored the responses at specified addresses in its memory. Responsive to the current request, the manager sends a response which had been previously prepared and stored at the specified address. In general, the manager prepares in advance responses to future anticipated requests for services, with the prepared responses being functions of the current requests for services, and stores the responses at specified addresses in memory. In greater detail, a request for services which specifies an address is sent over an address bus to a generic adapter manager, and responsive thereto the manager sends back a response which had been previously stored in a location in memory specified by the address. In general, the manager prepares responses to future anticipated requests for services and stores them at specific locations in a local memory, such that future responses are prepared and stored concurrently with the transmission of current responses over the data bus to the requesting device.

The future possible responses are prepared by logic circuits in the generic adapter manager. The logic circuits include foreground logic circuits and background logic circuits. The background logic operates to stay a step ahead of received requests for services in the form of primitives by preparing a next free buffer pointer and a next free packet pointer and stores the two pointers in a register, which is accessible to the foreground logic to generate timely responses to a current request by a packet memory interlace. The user of services sends a current request by a read operation which reads data at a specified address in memory in the same synchronous bus cycle.

BRIEF DESCRIPTION OF THE DRAWINGS

The foregoing objects and advantages of the present invention for a generic high bandwidth adapter may be more readily understood by one skilled in the art with reference being had to the following detailed description of several preferred embodiments thereof, taken in conjunction with the accompanying drawings wherein like elements are designated by identical reference numerals throughout the several views, and in which.

DETAILED DESCRIPTION OF THE DRAWINGS

Figure 1:
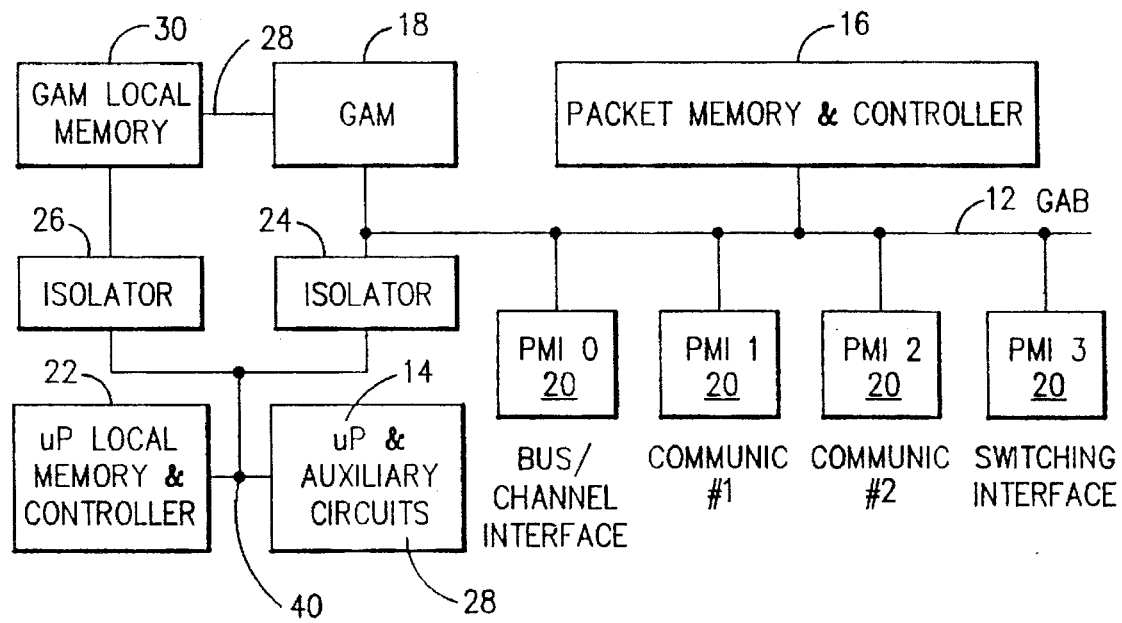
FIG. 1 is a schematic block diagram illustrating the major components of a generic high bandwidth adapter architecture pursuant to the present invention.

This specification is rather lengthy, and to assist in its organization, the following chapters and subchapters have been logically organized and arranged according to the following schedule:
1.0 Overview
1.1 Adapter Communication Environment
1.2 Adapter Components
    1.2.1 Processor Subsystem (P)
    1.2.2 Packet Memory (PM) and Controller
    1.2.3 Adapter Port and Packet Memory Interface—PMI
    1.2.4 Generic Adapter Bus—GAB
    1.2.5 Generic Adapter Manager—GAM
        1.2.5.1 GAM Kernel
        1.2.5.2 GAB Arbiter 1.2.5.3 GAB Monitor
1.2.5.4 GAM Local Memory
2.0 Adapter Architectural Features and Data Flows
2.1 Adapter Data Flows
3.0 Packet Memory (PM) and Controller
3.1 PM Organization
3.2 PM Size
3.3 Packet Memory Controller
3.4 PM Data Integrity Protection
4.0 Generic Adapter Manager (GAM)
4.1 GAM Major Functions
4.2 GAM Design Objectives
4.3 GAM Performance Objectives
4.4 Buffer, Packet, and Queue
    4.4.1 Buffer and Buffer Table Entry (BTE)
    4.4.2 Packet and Packet Table Entry (PTE)
    4.4.3 Queue and Queue Control Block (QCB)
    4.4.4 Buffer, Packet, and Queue Relationship
4.5 GAM Primitives
    4.5.1 REQ_RX—Request Reception
    4.5.2 REQ_TX—Request Transmission
    4.5.3 REQ_BUF—Request Buffer
    4.5.4 NXT_BUF—Next TX Buffer Request
    4.5.5 ENQ_PKT/R—Enqueue Packet/Reception
    4.5.6 ENQ_PKT/N—Enqueue Packet/Normal
    4.5.7 DEQ_PKT—Dequeue Packet
    4.5.8 REL PKT—Release Packet
    4.5.9 FLUSH—Flush Packet
    4.5.10 END TX—End Transmission
    4.5.11 ENQ_ENT—Enqueue Event
    4.5.12 DEQ_ENT—Dequeue Event
    4.5.13 RD_RSR—Read Response Status Register
    4.5.14 RD_QSR—Read Queue Status Register
    4.5.15 RD_GAM—Read GAM Content
    4.5.16 WT_GAM—Write GAM Content
4.6 GAM Response—Synchronous vs. Asynchronous
4.7 Packet Types
4.8 Traffic Types and Controls
4.9 Multicast Packet Feature Support
4.10 Multiple Interleaved Concurrent Packet Transmission/Reception
4.11 GAM State Machine—Packet Life Cycle
4.12 Event Control
4.13 Generic Adapter Bus Arbiter
4.14 Generic Adapter Bus Monitor
5.0 Queue Scheduling and Notification
5.1 Queue Status Notification Mechanism
5.2 Data/Control Flow Example
6.0 Generic Adapter Bus (GAB)
6.1 Bus Signals
6.2 Bus Contention and Grant Process
6.3 GAB Bus Priority Scheme
6.4 Bus Operation Scheme and Cycle Limitation
6.5 Bus Operations and Cycle Timings
    6.5.1 Single Read/Write Operation
    6.5.2 Stream Mode Read Operation
    6.5.3 Stream Mode Write Operation
    6.5.4 Stream Mode Pipelined Read Operation
7.0 Packet Memory Interface—PMI
7.1 Generic Functions of the PMI
7.2 PMI Overview
7.3 PMI Bus Activities
    7.3.1 PMI—GAB Address Responses
    7.3.2 PMI—GAB Interface Signals
7.4 PMI Communications Front End Interface
7.5 PMI Internal Registers
    7.5.1 PMI Interrupt Status Register
    7.5.2 GAB Interrupt Mask
    7.5.3 CFE_Interrupt_Mask
    7.5.4 Queued-Id
    7.5.5 PMI-ID
    7.5.6 Queue_MAP_Inbound[0:255]
    7.5.7 Gus_Burst_Length
    7.5.8 Bus_Burst_Time
    7.5.9 Shadow_Queue_Status_Register
    7.5.10 Staged_Channel_Status_Register
    7.5.11 Asynchronous Interface Address Buffer
    7.5.12 Asynchronous Interface Data Buffer
    7.5.13 Inbound Byte Order
    7.5.14 Outbound Byte Order
    7.5.15 Inbound Memory Base Address
    7.5.16 Inbound Memory Transfer Count
    7.5.17 Outbound Memory Base Address
    7.5.18 Outbound Memory Transfer Count
7.6 PMI Error and Reset Actions
8.0 Processor Subsystem
8.1 Local RAM & RAM Controller
8.2 ROS/EEROS
8.3 P Auxiliary Logic
8.4 GAB Isolator
8.5 GAM Local Bus Isolator
1.0 Overview The generic high bandwidth adapter embodies a unified architecture designed for high speed communication adapters. It provides a development platform for the interconnection of buses, channels, and communication networks. While the maximum configuration of each adapter is limited, arbitrarily large systems can be configured by interconnecting multiple adapters using a switching fabric connected to a port on each adapter.

This chapter provides an overview on the adapter communication environment and an introduction to the major adapter components.

1.1 Adapter Communication Environment

The generic high bandwidth adapter is designed to reside in a communication network environment capable of carrying a wide spectrum of traffic. This traffic ranges from time-critical, urgent traffic, and bandwidth-critical, synchronous traffic, to less time-critical asynchronous background traffic. This integrated network may be homogenous or may consist of several different types of local area networks interconnected through a high bandwidth back bone network. The network attachments may range from simple devices such as terminals and printers to intelligent devices such as mainframe hosts and network controllers. Network interconnection in such an environment may be based on simple bridging devices connecting homogenous local area networks, or complicated high-level gateways which not only connect two heterogeneous networks but also provide the protocol conversion and network routing necessary to interconnect separately administrated domains.

The traffic flowing in this network, regardless of type, is carried in the form of data stream segments called packets. When two network nodes wish to exchange information over the network, they send their information in packets. One of the key factors for determining the optimal packet size is the network transmission media bit error rate. With the low error rates of coax cable and optical fiber links, packet sizes may be on the order of thousands of bytes. Another factor affecting packet size is the latency requirement of the applications running on the end nodes. The smaller the latency time requirement, the shorter the packets.

Each packet will, in general, contain two components: control information and data. The data is provided by the user-level applications running on the two communication end-nodes. The control information, often calked a header, is required by the communication protocols which are used to mediate the information exchange. Header information is interpreted by the communications protocol processor before a packet is passed to the application process. Headers are actually encoded messages exchanged between peer protocol elements to ensure that the data has arrived correctly at the intended destination. Often, the communication protocols are also responsible for resending packets that arrived with errors.

Before a packet arrives at its destination, it may travel through several intermediate network nodes. At the intermediate nodes, the packet may be affected by several layers of software and hardware before reaching the network level protocol entity. The control information in the packet allows the network layer entity in the intermediate node to determine which outbound link the packet should be routed to. Once this routing has been determined, the packet will potentially flow through the same layers of software and hardware again in the reverse direction. To prevent packets from backing up at the layer boundaries, the software and hardware in the network nodes must be capable of processing packets at the intended packet arrival rate.

The generic high bandwidth adapter is designed for the communication environment described above. When a packet is received at one of the adapter ports, the adapter port will move the received packet into the adapter packet memory and queue the packet for processing by the adapter's processor. When available, the processor will process the packets in the adapter packet memory. Based on the packet control information and programmed communication layer functions, the processor can determine whether a packet has reached its final destination. If a packet has reached its final destination, the processor will transfer the processed packet to the adapter port which is connected to a system bus or a system I/O channel. If a packet has not reached its final destination, the processor will determine which link or network the packet should be routed to next and transfer this packet to the outbound adapter port connected to the target network link. In either case, one of the other adapter ports will be informed that there is a packet ready to be shipped out. The informed adapter port will move the packet out of adapter packet memory and control packet transmission.

1.2 Adapter Components

As shown in FIG. 1, the generic high bandwidth adapter has four major components linked together by a high performance generic adapter bus (GAB) 12. These components are:

1. Processor (P) 14 Subsystem
2. Packet Memory (PM) 16 and Controller
3. Generic Adapter Manager (GAM) 18
4. Adapter Port with Packet Memory Interface (PMI) 20

1.2.1 Processor Subsystem (p) 14

The adapter contains a local processor 14 subsystem used to run communication code and process packet queues. Included in this processor subsystem are:

a local memory 22, where communication code and immediate control data reside;

an isolator 24, which connects the processor system to the GAB;

another isolator 26, which connects the processor to the GAM local bus;

the auxiliary circuits 28, essential for processor operations, including several hardware timers, an interrupt controller, and a local memory controller.

Making use of the isolators, the processor can access any memory in the adapter card. There are at least three separate memory blocks within the adapter: Packet Memory 16, GAM local memory 30, and the processor local memory 22. In addition, each of the ports in the adapter may have memory accessible through the port PMI 20. This mechanism is one of the PMI functions and will be described in chapter 7.0, Packet Memory Interface—PMI.

The processor local memory 22 is used to store the code and the code immediate control data. Part of the processor local memory is nonvolatile memory used to store the power-on diagnostic code and the IPL (Initial Program Load). When the adapter is powered on, the processor starts its execution from the nonvolatile memory and runs the IPL code to load the communication code into its local random access memory. When the program load is complete, the IPL code forces the processor to continue its execution from the newly loaded communication code. The processor subsystem also contains auxiliary circuits 28 such as an interrupt controller, several hardware timers, and a local memory controller. These auxiliary circuits are essential for the successful execution of processor functions. For details about the p auxiliary circuits, refer to chapter 8.0, Processor Subsystem.

A guiding principle in the adapter architecture is that the P needs only to look at header information in a packet and does not need to bring packet's user data portion into its local memory. The PMIs may contain hardware for providing checksum information about the data portion of the packets in support of this principle. Refer to chapter 7.0, Packet Memory Interface—PMI for checksum support in the PMI.

1.2.2 Packet Memory (PM) and Controller 16

Packets that arrive at each individual adapter port are stored in the PM 16 awaiting disposition. The PM 16 is attached to the GAB 12 and made up of high speed random access memory. There is an implementation limit of 16 megabytes of memory in the PM. In the implementation under discussion, this memory is segmented into a set of 256-byte buffers. Packets are stored in one or more buffers in the PM and can be deleted or routed by the P to one of the adapter ports. Packets are sent to and retrieved from the PM through a PMI 20 component. The management of the PM buffer space is the responsibility of the GAM 18.

The packet memory controller provides the interface functions to the GAB 12 for the PM 16. It isolates the PM from the GAB's requirements such as parity generation and response generation. For details about the packet memory controller, refer to chapter 3.0, Packet Memory (PM) & Controller.

1.2.3 Adapter Port and Packet Memory Interface—PMI 20

There is a PMI 20 for each individual port in the adapter. There can be several PMIs in one adapter, up to four ports in one adapter. The PMI is connected to the GAB and provides the mechanism for getting packets into and out of the PM 16. For example, a Microchannel interface connected to a PMI can provide a PS/2 system a path for delivering packets to a communication network. Network attachment of the adapter is through a PMI connected to the GAB 12. A major PMI function is to obtain buffers from the GAM 18 for storing arriving packets in the PM. The PMI can also read out packets from the PM and pass them to its front end. The PMI is the only interface between an individual adapter port and the remainder of the generic high bandwidth adapter. For details about the PMI functions, refer to chapter 7.0, Packet Memory Interface—PMI.

1.2.4 Generic Adapter Bus—GAB 12

The GAB 12 connects all the major adapter components together. The GAB is a synchronous bus on the physical signal interface level because all the bus signals are synchronized to a bus clock. However, the bus operations are asynchronous and act in a command/response fashion. The response to a bus command can be returned in any bus cycle. The speed of this bus is one of the more critical adapter performance parameters and needs to match the adapter throughput requirements. One of the adapter architecture goals is to reduce the interference on this high performance bus.

For details about bus signal definition and bus operation timings, refer to chapter 6.0, Generic Adapter Bus (GAB).

1.2.5 Generic Adapter Manager—GAM 18

The GAM 18 contains several functional components which perform adapter management functions. These components are the GAM Kernel, the arbiter for the GAB, the monitor for the GAB, and the CAM local memory 30.

1.2.5.1 GAM Kernel

The GAM Kernel implements the data structures in the PM and performs all data management functions. There are three main data structures manipulated by the GAM: buffers 32, packets 34, and queues 36, FIG. 2. Based on these three data structures, the GAM performs several important functions such as packet traffic control, buffer/packet management, and input/output queue scheduling.

When the p or a PMI 20 needs buffer space to receive a packet, it makes a buffer request to the GAM 18. The GAM links successively requested buffers 32 from the P or the PMI together to form packets 34. Packets are further organized into queues 36. Each PMI in the adapter has several queues assigned to it for input and output. After a packet is moved into the PM 16, the PMI will command the GAM to place the packet into a particular queue. Eventually, the GAM will notify the code running on the p that packets are available for processing. Code running on the P will dequeue the packets, process them, and then enqueue them into output queues.

This action can also take place based on polling by the P. The GAM will handle all the queueing operations and notify the PMIs on the status of the output queues. The GAM can also be requested to release a packet, which causes all buffers belonging to that particular packet to be put back in the free buffer pool.

For details about the GAM Kernel functions, refer to chapter 4.0, Generic Adapter Manager (GAM). For details about the queue scheduling policy and mechanism, refer to chapter 5.0, Queue Scheduling and Notification.

1.2.5.2 GAB Arbiter

The p 14 and the PMIs 20 all communicate using the GAB 12. The GAB arbiter grants bus control to the bus requester with the highest bus priority. The bus priority scheme adopted in the generic high bandwidth adapter is a combination of the preprogrammed default priority scheme and a round-robin equal priority scheme. Among the five potential bus requesters in the adapter, the P and four PMIs, one may be selected to always have the highest bus priority. The remaining four potential bus requesters will share the bus priority in a round-robin fashion. When the adapter is powered on, the P is the default highest priority bus requester. However, the P can change the highest priority bus requester to any PMI at any time by issuing a request to the GAM 18. For details about the GAB request/grant process and the bus priority scheme, refer to chapter 6.0, Generic Adapter Bus (GAB).

1.2.5.3 GAB Monitor

In addition to performing the bus arbitration and the buffer management functions, the GAM 18 also acts as a bus monitor for the GAB 12 and performs the following bus monitoring functions:

Parity Checking—the GAM constantly monitors the bus; whenever there is a bus operation on the GAB, the GAM will check both the address bus parity and data bus parity; if a parity error is detected, the GAM will activate the bus error signal line on the GAB to inform the remainder of the adapter about the error.

Bus Cycle Length Checking—after the GAM grants bus control to a bus requester, it will start a counter immediately; this counter is clocked by a GAB bus clock called BCLK; if the counter reaches the predefined limit before the current bus master releases bus control, the bus error signal will also be activated by the GAM; the bus cycle limit is programmable by the P 14 by writing to the GAM's internal registers.

When a bus error occurs, the GAM will log the bus access address, the current bus master, and the causes of the bus error in its internal storage. This information can be retrieved later by the P for error isolation and recovery purposes. For details about the GAM bus monitoring function, refer to chapter 4.0, Generic Adapter Manager (GAM).

1.2.5.4 GAM Local Memory 30

Those data structures used by the GAM 18 to organize buffers 32 into packets 34 and packets into queues 36 are stored in the GAM local memory 30. The GAM accesses this memory through its local bus 38 so that it will not interfere with concurrent packet transfer over the GAB 12. This memory 30 is also accessed by the P 14 either via an isolator 26 or through the use of the GAM primitive requests on the GAB. Refer to section 4.5, GAM Primitives for a detailed description of the GAM primitives.

The GAM local memory is 16 bits wide and is preferably implemented in static RAM. Each megabyte of memory in the PM requires at least 8K by 16 bits GAM local memory.

2.0 Adapter Architectural Features and Data Flows

The generic high bandwidth adapter architecture is illustrated in FIG. 1. To satisfy the high throughput and generic usability requirements, this adapter architecture possesses the following features:

Minimum Interference—There can be up to three major different simultaneous data flows in the adapter without any interference between them. These three data flows are:

1. Packet Data Movement between a PMI 20 and the PM 16;
2. GAM Operation between the GAM 18 and the GAM local memory 30;
3. P 14 Operation between the P 16 and its local memory 22;

In addition, there are a myriad of other flows internal to each communication adapter port.

Parallel Operation—Packet operations run in parallel on two levels:

During packet reception, while the P 14 is processing previously received packets, the 18 and the PMIs 20 can move additional inbound packets into the PM 16. During packet transmission, the GAM and the PMIs can move outbound packets from the PM while the P moves on to process the next inbound packets in the PM.

The second level of parallelism occurs at the buffer level between the GAM 18 and PMIs 20. When a PMI begins packet movement, it makes a GAM request for a free buffer. When the GAM receives this buffer request from the PMI, it supplies the PMI with a new buffer pointer in the same GAB bus cycle. After the PMI receives the new buffer pointer, it can start its packet movement immediately. At the same time, the GAM continues its operations in the background to complete the current request and prepare the response for the next request.

Functional Growth Potential & Extensive Diagnostic Capability—One of the key design principles in the adapter architecture is that the processor, if necessary, shall be able to perform any packet memory function done by any other piece of hardware in the adapter. This principle implies that the P shall be able to access all the memory in the adapter. The significance of this principle is twofold:

Functional Growth Potential—because the P can modify any data in any memory and can act as a master on any of the data buses, it can implement any new packet memory management functions that may be required, e.g., packet encryption, data encapsulation and physical address translation. This architecture provides not only a modular and flexible interface between the adapter hardware and code but, more importantly, functional growth potential;

Extensive Diagnostic Capability—with this architecture, the P can redo any function done by any other piece of hardware in the adapter and compare its result with the hardware result. The P can intentionally inject an error into a data storage location and check the adapter hardware's capability to detect and recover from this error. This would allow a significant portion of the adapter diagnostic capability to be implemented in code and fulfill potential adapter reliability, availability, and serviceability requirements. Diagnostic code can be stored in a nonvolatile memory device for power-on diagnostics or in a RAM-loadable format for on-line problem determination.

2.1 Adapter Data Flows

There are three different internal data buses inside a generic high bandwidth adapter: the GAB 12, the P local bus 40, and the GAM local bus 38. Data can be exchanged between any two adapter components using one of these three different internal buses. There can only be one data exchange on one internal bus at a time. However, the three different internal adapter buses can engage in data exchanges simultaneously, i.e. packet movement on the GAB, P processing on the P local bus, and GAM processing on the GAM local bus can occur simultaneously.

The following paragraphs contain a brief description of all six possible data flows inside the adapter:

Packet Movement
Origin—PMI 20
Destination—PM 16
Running On—GAB 12
Description—Packet movement is used by a PMI to move packets to and from the PM during packet reception and transmission. The speed of packet movement is critical to the adapter's performance and shall be able to support an aggregate throughput of at least two times the peak net adapter data throughput requirement. The GAB supports stream mode operation to satisfy this timing requirement.

GAM 18 Primitives and Response
Origin—P 14 or PMI 20
Destination—GAM 18
Running On—GAB 12
Description—GAM primitives are invoked whenever the P or a PMI requires the GAM to perform packet memory management functions such as packet enqueue/dequeue or free buffer allocation. The request and response information of the GAM primitives is carried out on the address lines and data lines of the GAB for MM/IO (Memory Mapped/Input Output) bus operations. The processing in the GAM is single-threaded, i.e. once the GAM accepts a request from the P or a PMI, no other requests will be accepted until the GAM completes the current request. The GAM responses can be either synchronous or asynchronous. Synchronous response means that the requester can receive the response in the same GAB cycle as the request. Asynchronous response means that the GAM response to a request is unavailable within a single bus cycle; rather, the requester has to retrieve the response from a dedicated response register in a bus cycle negotiated later.

GAM 18 Local Operations
Origin—GAM 18 or P 14
Destination—GAM Local Memory 30
Running On—GAM Local Bus 38
Description—GAM local memory is used to store all the data structures essential for the GAM to perform its packet memory management functions. For the GAM to process the requests from the P and PMIs, it must be able to read from and write to the GAM local memory. In addition, the adapter architecture also allows the P to access the GAM local memory in order to provide extensive diagnostic capability and future GAM functional enhancement.

P 14 Direct Control Message
Origin—P 14
Destination—PMI 20 and Adapter Port
Running On—GAB 12
Description—The p direct control message is used by the P to control and program the PMI and the adapter port internal hardware. The direct control message is carried out as a MM/IO bus operation on the GAB. The applications for the direct control messages include reads/writes to the PMI internal status registers and reads/writes to the adapter port internal front-end control register.

P 14 Local Operation
Origin—P 14
Destination—P Local Memory 22
Running On—P Local Bus 40
Description—P local operations include the P instruction fetch and immediate control data read/write. The P local bus timing shall be able to support the intended memory access time and the P MIPS (millions of instructions per second) rate without the introduction of any idle state. The local memory data read/write operations are performed by communication code running inside the P.

P 14 Packet Processing
Origin—P 14
Destination—PM 16
Running On—GAB 12
Description—When a packet is received by an adapter port, the PMI will store the packet data along with the packet header control information into the PM. This packet header Control information is essential for the communication code in the P to perform its various protocol layer functions. The P needs to read/write data from/to the PM. This data flow is accomplished as a series of stream mode bus operations on the GAB.

3.0 Packet Memory (PM) 16 and Controller

In the generic high bandwidth adapter, the PM 16 is used as the buffer storage for the incoming and outgoing packets. When a packet is received in one of the adapter ports, the associated port PMI 20 will store the packet into the PM. Later, the communication code in the P 14 will process the received packet header information in the PM according to its protocol layer functions. After a packet is processed by the P, the PMI on another adapter port will move the packet from the PM and start the packet transmission. However, it is also possible to receive a packet in one PMI, store the packet in the PM, and transmit the packet immediately through another PMI without any P processing.

3.1 PM 16 Organization

The PM 16 is used by the generic high bandwidth adapter to store packets. This memory is dedicated for packet storage. The size of the PM in the generic high bandwidth adapter has an implementation limitation of 16 megabytes. The PM is organized in buffers of memory. Each buffer in the described implementation is 256 consecutive bytes and each buffer starts on a buffer boundary (the least significant 8 bits of each buffer starting address are all zeros). All the memory buffers in the PM are managed by the GAM. For details about the GAM, refer to chapter 4.0, Generic Adapter Manager (GAM).

The speed of the PM is crucial for the adapter performance. The PM access time shall be able to support the intended GAB 12 bus cycle time without introducing any delay.

3.2 PM 16 Size

The determination of the PM 16 size shall be based on the following factors:
Cost
Card Real Estate
Packet Size
Number of Active Logical Link Stations
Logical Link Station Window Size
Other Link Station Attributes such as round-trip and retransmission timers
Desired Performance Level
etc.

3.3 Packet Memory 16 Controller

The PM 16 can be implemented in either static RAM (SRAM) or dynamic RAM (DRAM). If the PM is implemented in SRAM, no major functions except signal interface need to be performed by the memory controller. On the other hand, if the PM is implemented in DRAM, the memory controller needs to perform the following functions:
Dynamic Memory Refresh;
ECC Generation/Correction/Checking;
Row Address and Column Address Control Selection;
Parity Generation on the GAB;
etc.;

3.4 PM 16 Data Integrity Protection

If the PM 16 is implemented in SRAM, the data integrity in the memory content shall be protected by parity memory bits. On a PM write operation, the parity memory bits will be set according to the GAB data parity bits. On a PM read operation, the content of parity memory bits will be propagated on the GAB data parity lines. If there is a corruption of the memory content, the bus monitor in the GAM will detect a parity error and assert the bus error signal line.

If the PM is implemented in DRAM, the data integrity shall be protected by 7-bit ECC code. This 7-bit ECC code is capable of correcting one-bit errors and detecting two-bit errors. On a PM write operation, the PM controller generates seven ECC bits and stores these bits in PM. On a PM read operation, the PM controller performs the ECC checking. If there is a one-bit ECC error, the memory controller will correct the one-bit error and continue the read operation. However, the memory controller will generate a maskable interrupt to the P to indicate the error situation. If there is a two-bit ECC error, the memory controller shall "lock" itself internally so it cannot respond to any subsequent PM read/write operation. When this happens, the bus master addressing the PM on the following bus cycle will not receive any response from its command/request. After a set period of time, the bus monitor in the GAM will detect the "no response" condition and generate a bus error signal on the GAB. As will be mentioned in chapter 4.0, Generic Adapter Manager (GAM), the GAM will log the access address during the bus error. From this information, the P can locate the cause of the bus error.

4.0 Generic Adapter Manager (GAM) 18

This chapter and chapter 5.0, Queue Scheduling and Notification provides a detailed description of the functions and features provided by the GAM 18 as well as its interfaces and internal data structures. Because of the distinctive nature of the GAM Queue Scheduling function, there will be no attempt to describe it in this chapter. Instead, chapter 5.0, Queue Scheduling and Notification will be used solely to describe the details of queue scheduling.

4.1 GAM 18 Major Functions

Buffer 32 Management
Packet 34 Management
Queue 36 Scheduling
Event Control
Traffic Control
p 14 and PMI 20 Interface
Multicast Packet Feature Support
Multiple Interleaved Current Packet Transmission/Reception
Generic Adapter Bus Arbiter
Generic Adapter Bus Monitor

4.2 GAM 18 Design Objectives

To provide a uniform interface to the P 14 and the PMI 20 hardware;
To provide a uniform interface to the P communication code;
To encapsulate the P and the PMI design from the packet memory internal control block structure;
To reduce the P code overhead on repetitive functions;
To provide a generic platform for future functional enhancement;
To minimize the interference to GAB data movement;
To support the adapter throughput and response-time performance objectives;
To support communication function implementations such as multicast packet support;

4.3 GAM 18 Performance Objectives

Response Time
The definition of the GAM response time is the time interval from the reception of a GAM request to a GAM response. The response for the following time-critical GAM requests shall be ready in the same GAB bus cycle as the request is made:
Packet Reception Request (REQ_RX)
Free Buffer Request (REQ_BUF)
Next Transmit Buffer Request (NXT_BUF)

Throughput

The worst case throughput requirement for the GAM is in the case of a series of short packets (256 bytes or less) received by the adapter. To receive a short packet, the GAM needs to process the following two requests:

Request Packet Reception (REQ_RX)

Enqueue Packet after Packet Reception (ENQ_PKT/R)

To sustain the worst case data flow without the GAM becoming the bottleneck of the adapter, the total processing time for these two requests shall be less than the transmission time of a short packet.

4.4 Buffer 32, Packet 34, and Queue 36

This section defines the meaning of buffer 32, packet 34, and queue 36 in the generic high bandwidth adapter and describes the relationship between them and how they are logically connected together by the GAM. Buffers are the smallest logical memory entity allocatable in the PM. Packets are groups of buffers logically connected together. Groups of packets are logically linked together to form a queue.

4.4.1 Buffer 32 and Buffer Table Entry (BTE)

As mentioned in chapter 3.0, Packet Memory (PM) and Controller, the PM 16 in the generic high bandwidth adapter is partitioned into many buffers 32. Each buffer is defined to be 256 consecutive bytes, starting at a buffer boundary. For each buffer in the PM, there is one corresponding buffer table entry (BTE) defined in the GAM local memory 30. The BTE is 4 bytes long and the first two bytes contain the "next buffer pointer." During adapter initialization, all the buffers are initialized to be free buffers and all the free buffers in the free buffer pool are linked together by the next buffer pointer in the BTEs to form a free buffer list. In this case, the next buffer pointer in the BTE of a free buffer will point to the next free buffer in the list. When the free buffers are allocated by the P 14 or the PMIs 20 to store the packet data, they become packet buffers. The next buffer pointer in the BTE of a packet buffer will point to the next packet buffer in the same packet unless the packet buffer is the last buffer in a packet. In this case, the next buffer pointer in the BTE of the last packet buffer will be set to zero. The relationship between BTE and buffer is one to one and in sequence, i.e. BTE #1 represents buffer #1, BTE #2 represents buffer #2, etc. However, BTE #0 and its address are reserved for the internal usage by the GAM and, therefore, buffer #0 in the PM is not used in the normal fashion.

In addition to the next buffer pointer, each BTE also contains the 1-byte buffer offset and the 1-byte buffer byte-count information. These two bytes of information carry no meaning when the buffer is a free buffer. When the buffer is a packet buffer, these two bytes of information tell where the valid packet data starts in the buffer and how many bytes of data are valid in the buffer.

4.4.2 Packet 34 and Packet Table Entry (PTE)

A packet 34 is a unit of data that flows in and out of the generic high bandwidth adapter from the attached networks or systems. A packet can be of any length. When a packet is to be stored in the PM 16, it does not have to be stored in sequence. Instead, a packet in the PM is stored as a group of buffers and the number of buffers in the group is determined by the length of the packet. The buffers in the group do not have to be in sequence. In the GAM, packet buffers are linked together through the "next buffer pointer" in the BTE. Once a packet is stored in the PM, it will be treated as a unit by the GAM 18. To represent this unit, the GAM has one packet table entry (PTE) in its local memory for each existing packet in the PM. So, from the GAM's point of view, a packet in the PM is a PTE plus several associated BTEs linked together.

The number of PTEs in the GAM is determined by the size of the GAM local memory. Each PTE is 16 bytes long and contains the information such as packet state, first packet buffer, last packet buffer.

4.4.3 Queue 36 and Queue control Block (QCB)

A queue 36 in the generic high bandwidth adapter is a list of packets stored in sequence. A queue has a queue head and a queue tail. A packet can be enqueued either from the queue head (for urgent traffic) or from the queue tail (for synchronous and asynchronous traffic), but a packet can be dequeued only from the queue head. In order to control the packet enqueue and dequeue operations, the GAM 18 has a Queue Control Block (QCB) for every queue defined in the adapter. In every QCB, there is a queue head pointer and a queue tail pointer pointing to the first packet and the last packet in the queue.

4.4.4 Buffer 32, Packet 34, and Queue 36 Relationship

Figure 2:
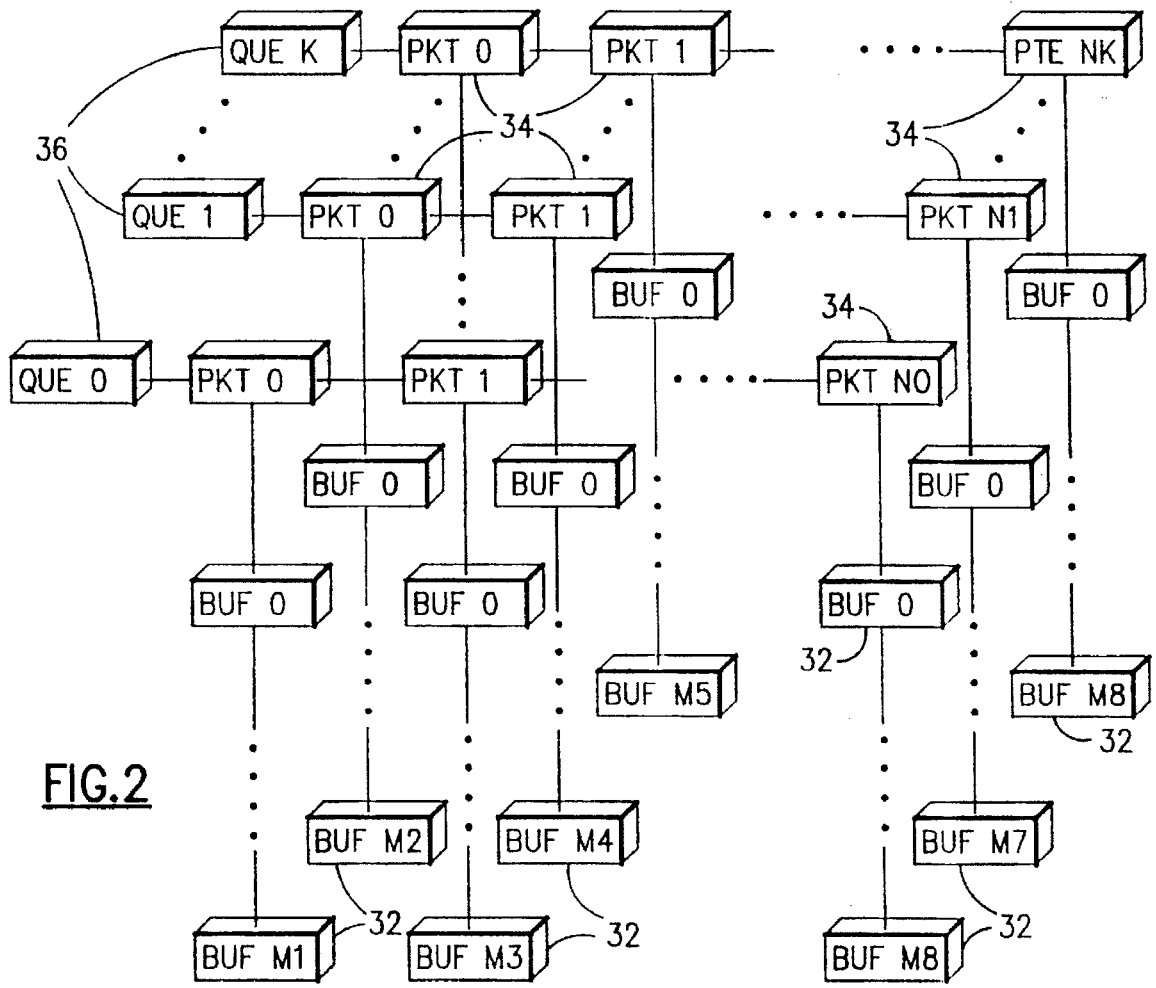
FIG. 2 shows buffer/packet/queue relations in a generic high bandwidth adapter architecture, and more particularly illustrates the organization of buffers into packets and the organization of packets into queues.

FIG. 2 shows the logical relationship between buffers 32, packets 34, and queues 36 from the GAM's point of view, and illustrates the organization of packets in buffers and the organization of packets into queues.

4.5 GAM 18 Primitives

This section provides a list of all the primitives supported by the GAM 18. There will be a subsection describing each primitive defined in the GAM. In each subsection, the request format will be described first, followed by the functional description and the primitive response. Since the GAM primitive request and response are carried out as GAB 12 MM/IO operations, the request and response format will be described using the GAB data and address lines. For details about GAB bus signals, refer to chapter 6.0, Generic Adapter Bus (GAB).

Note: there is no need to specify which bus master issues the primitive in the request format, because the GAM, acting also as the GAB arbiter, knows exactly which bus master has issued the primitive when the request is received.

4.5.1 REQ_RX—Request Reception

Request Format:

Request Code—4 Bits, A22-A19: B'0000';

Request Identification —3 Bits, A18-A16; (refer to section 4.10, Multiple Interleaved Concurrent Packet Transmission/Reception)

Reserved and Zero—A15-A02;

Function—There are two possible scenarios in which this primitive will be invoked by the P or the PMIs to request packet and buffer space from the GAM:

Packet Reception: When there is an incoming packet addressing an adapter port, the PMI on that port will issue this primitive to the GAM to set up the packet reception.

New Packet Generation: In many situations, the P communication code needs to create a new packet in the adapter and transmit the newly generated packet to the network for "command" or "acknowledgement" purposes. When this situation arises, the P can issue this primitive to set up the generation of a new packet just as the PMI does in the case of packet reception.

Upon the reception of this request, the GAM will allocate the first available PTE and the first free buffer in the free buffer pool and pass the allocated free buffer pointer in the GAM response. When the P or a PMI receives this buffer pointer, it can start its packet data movement immediately.

Request issued as a GAB MM/IO read operation;

Response Format:

Packet Pointer—16 Bits, D31-D16; if D31-D16 are all zeros, the request has been denied;

Buffer Pointer—16 Bits, D15-D00; if D15-D00 are all zeros, the request has been denied;

4.5.2 REQ_TX—Request Transmission
Request Format:
Request Code—4 Bits, A22-A19: B'0001';
Request Identification—3 Bits, A18-A16;
Queue Identification—8 Bits, A09-A02;
Reserved and Zero—A25, A15-A10;
Function—When the PMI is ready to serve an outbound queue, it will issue a REQ_TX primitive to start packet transmission. Upon the reception of this request, the GAM will find the head of the queue (the queue identification is passed as a part of the request) and return the first buffer offset, the first buffer count, and the first buffer pointer in the response.
Request issued as a GAB MM/IO read operation;
Response Format:
Buffer Offset—8 Bits, D31-D24;
Byte Count—8 Bits, D23-D16;
Buffer Pointer—16 Bits, D15-D00; if D15-D00 are all zeros, the request has been denied or there is no more buffer in the packet;

4.5.3 REQ_BUF—Request Buffer
Request Format:
Request Code—4 Bits, A22-A19: B'0010';
Request Identification—3 Bits, A18-A16;
Reserved and Zero—A15-A02;
Function—During packet reception or new packet generation, a PMI or the P will issue this primitive to request more data buffer space allocation. When the GAM receives this request, it allocates the first free buffer in the free buffer pool and passes the allocated free buffer pointer in the response. When the P or a PMI receives the response, it can move packet data into the allocated buffer.
Request issued as a GAB MM/IO read operation;
Response Format:
Reserved—D31-D16;
Buffer Pointer—16 Bits, D15-D00; if D15-D00 are all zeros, the request has been denied;

4.5.4 NXT_BUF—Next TX Buffer Request
Request Format:
Request Code—4 Bits, A22-A19: B'0011';
Request Identification—3 Bits, A18-A16;
Reserved and Zero—A15-A02;
Function—During packet transmission, a PMI will issue this primitive to request the next buffer pointer in the transmission packet from the GAM. Upon the reception of this request, the GAM will look for the next buffer pointer in the current transmitted packet and pass the buffer pointer, the buffer offset, and the buffer byte count to the PMI in the response. When the PMI receives the response, it can set up the packet movement from the PM for transmission.
Request issued as a GAB MM/IO read operation;
Response Format:
Buffer Offset—8 Bits, D31-D24;
Byte Count—8 Bits, D23-D16;
Buffer Pointer—16 Bits, D15-D00; if D15-D00 are all zeros, the request has been denied;

4.5.5 ENQ_PKT/R—Enqueue Packet/Reception
Request Format:
Request Code—4 Bits, A22-A19: B'0100';
Request Identification—3 Bits, A18-A16;
Traffic Type—2 Bits, A15-A14; (refer to section 4.8, Traffic Types and Control)
A15-A14=B'00': Asynchronous Traffic;
A15-A14=B'01': Synchronous Traffic;
A15-A14=B'10': Urgent Traffic;
A15-A14=B'11': Unused;
Packet Type—2 Bits, A11-A10; (refer to section 4.7, Packet Types)
A15-A14=B'00': Unused;
A11-A10=B'01': Type 1 Packet;
A11-A10=B'10': Type 2 Packet;
A11-A10=B'11': Type 3 Packet;
Queue Identification—8 Bits, A09-A02;
First Buffer Offset—8 Bits, D31-D24;
Last Buffer Count—8 Bits, D23-D16;
Next Buffer Pointer—16 Bits, D15-D00;
This field shall be set to zero during normal packet reception. In the multicast packet support situation, this field shall contain the first buffer pointer in the original multicast packet. For details, refer to section 4.9, Multicast Packet Feature Support.
Reserved and Zero—A13-A12;
Function—This primitive is invoked by the P or a PMI to request that a packet be enqueued after packet reception or new packet generation is complete. The GAM will enqueue the packet to the head of a queue if the packet is urgent traffic. Otherwise, the packet will be enqueued to the tail of a queue.
Request issued as a GAB MM/IO write operation;
Response—None;

4.5.6 ENQ_PKT/N—Enqueue Packet/Normal
Request Format:
Request Code—4 Bits, A22-A19: B'0101';
Queue Identification—8 Bits, A09-A02;
Packet Identification—16 Bits, D15-D00;
Reserved and Zero—A18-A10, D31-D16;
Function—This primitive is invoked by the P to request that a packet be enqueued in a queue. The GAM will enqueue the packet from the queue head if the packet traffic type, which was specified when the packet was originally enqueued, is urgent. Otherwise, the packet will be enqueued from the queue tail.
Request issued as a GAB MM/IO write operation;
Response—None;

4.5.7 DEQ_PKT—Dequeue Packet
Request Format:
Request Code—4 Bits, A22-A19: B'0110';
Queue Identification—8 Bits, A09-A02;
Reserved and Zero—A18-A10;
Function—This primitive is invoked by the P to request that a packet be dequeued from a queue. The queue identification is passed as a part of the request.
Request issued as a GAB MM/IO read operation;
Response Format:
Packet Pointer—16 Bits, D31-D15; if D31-D15 are all zeros, the request has been denied;
First Buffer Pointer—16 Bits, D15-D00; if D15-D00 are all zeros, the request has been denied;

4.5.8 REL_PKT—Release Packet
Request Format:
Request Code—4 Bits, A22-A19: B'0111';
Packet Identification—16 Bits, D15-D00;
Reserved and Zero—A18-A02, D31-D15;
Function—This primitive is invoked by the P to request that a packet be returned to the free buffer pool. The packet pointer is passed as a part of the request. When the GAM receives this request, it will release the packet and all the associated buffers to the free pool.

Request issued as a GAB MM/IO write operation;
Response—None;

4.5.9 FLUSH—Flush Packet
Request Format:
Request Code—4 Bits, A22-A19: B'1000';
Request Identification—3 Bits, A18-A16;
Reserved and Zero—A15-A02;
Function—This primitive is invoked by the P or a PMI to flush the current packet. During packet reception or new packet generation, if a PMI or the P decides it cannot complete the ongoing operation for some reason, it can issue this primitive to terminate the processing. When the GAM receives this request, it frees all the allocated buffers returning the buffers to the free buffer pool and the PTE to the free packet pool.

Request issued as a GAB MM/IO write operation;
Response—None;

4.5.10 END_TX—End Transmission
Request Format:
Request Code—4 Bits, A22-A19: B'1001';
Request Identification—3 Bits, A18-A16;
Reserved and Zero—A15-A02;
Function—This primitive is invoked by a PMI to signal the end of packet movement during packet transmission. When the GAM receives this primitive, it has several different ways to handle the transmitted packet depending on what type the packet is (refer to section 4.7, Packet Types).

Request issued as a GAB MM/IO write operation;
Response—None;

4.5.11 ENQ_ENT—Enqueue Event
Request Format:
Request Code—4 Bits, A22-A19: B'1010';
Reserved and Zero—A18-A02;
Event Data—32 Bits, D31-D00;
Function—This primitive is invoked by a PMI or the P to put an event into the GAM event FIFO. When the GAM receives this request, it will put the 4-byte event data into its internal memory and "wake up" the P to precess the event if necessary (refer to section 4.12, Event Control for event control);

Request issued as a GAB MM/IO write operation;
Response—None;

4.5.12 DEQ_ENT—Dequeue Event
Request Format:
Request Code—4 Bits, A22-A19: B'1011';
Reserved and Zero—A18-A02;
Function—This primitive is invoked by the P to retrieve event data from the GAM. When the GAM receives this request, it will retrieve the first 4 bytes of event data from its internal event FIFO and pass this information to the P for processing;

Request issued as a GAB MM/IO read operation;
Response Format:
Event Data—32 Bits, D31-D00; if there are no events, D31-D00 will be all zeros;

4.5.13 RD_RSR—Read Response Status Register
Request Format:
Request Code—4 Bits, A22-A19: B'1100';
Reserved and Zero—A18-A02;
Function—This primitive is invoked by the P or a PMI to retrieve the response for the previous GAM request. For details about the GAM response, refer to section 4.6, GAM Response—Synchronous vs. Asynchronous.

Request issued as a GAB MM/IO read operation;
Response Format:
Response Status Register—32 Bits, D31-D00;

4.5.14 RD_QSR—Read Queue Status Register
Request Format:
Request Code—4 Bits, A22-A19: B'1101';
Offset—3 Bits, A04-A02;
Reserved and Zero—A18-A05;
Function—This primitive is invoked by the P or a PMI to retrieve the bit map of its serving queue set. For details about queue sets and queue status registers, refer to chapter 5.0, Queue Scheduling and Notification. The input parameter, offset, is used to indicate which 32 bits of the queue status register are desired. For example, if offset=0, the queue status register for queue #0 to queue #31 will be returned in the response. If offset=1, queue #32 to queue #63 will be returned, etc.

Request issued as a GAB MM/IO read operation;
Response Format:
Queue Status Register—32 Bits, D31-D00;

4.5.15 RD_GAM—Read GAM Content
Request Format:
Request Code—4 Bits, A22-A19: B'1110';
Address—18 Bits, A25, A18-A02;
Function—This primitive is invoked by the P or the PMI to read memory and registers inside the GAM.

Request issued as a GAB MM/IO read operation;
Response Format:
Reserved—16 Bits, D31-D15;
GAM Content—16 Bits, D15-D00;

4.5.16 WT_GAM—Write GAM Content
Request Format:
Request Code—4 Bits, A22-A19: B'1111';
Address—18 Bits, A25, A18-A02;
Data—16 Bits, D15-D00;
Reserved and Zero—D31-D16;
Function—This primitive is invoked by the P to write memory and registers inside the GAM. The requester for this primitive shall be the P. Otherwise, no data will be written.

Request issued as a GAB MM/IO write operation;
Response—None;

4.6 GAM Response—Synchronous vs. Asynchronous

Some GAM requests require the GAM to return a response and some do not. For those requests that need a response, the GAM has an option to return the response synchronously or asynchronously. Before the definition for synchronous or asynchronous response can be presented, the following basic understanding about GAM operations must be established:

All the GAM actions are single-threaded, i.e. once a request is accepted by the GAM, the GAM will not accept another request until it completes the service for the current request. To serve a request, the GAM needs to perform a series of operations. This series of operations can be partitioned into two stages. The first stage of operations is the "critical stage" and it contains all the essential operations required to generate a response back to the requester within a short period of time. The second stage of operations is the "background stage" and it contains the remainder of the operations needed to complete the service.

For the GAM to generate a synchronous response for a GAM request, the following conditions must be satisfied:
the request requires a response;
the response is critical for the requester to continue its processing;

the request and its associated input parameters can be contained in 21-bit address lines and 4-bit byte-enable lines (bit 24 and bit 23 of the address bus are fixed in value for GAM requests and cannot be used to carry the request); if these conditions are met, the requester can make its request through a "read" operation and retrieve the response from the data bus in the same GAB bus cycle;

the duration of the "critical stage" operations is less than a predefined period of time. This time is implementation dependant;

If these conditions are note met, the response must be asynchronous. In the case of an asynchronous response, the requester must issue the GAM primitive, RD_RSR (read response status register), to retrieve the response later on (when the GAM completes the service for the request). The GAM keeps several response status registers internally, one for the P and the others for the PMIs.

A synchronous response has the following characteristics:

the request corresponding to a synchronous response was issued through a "read" GAB bus operation;

the response can be returned on the data bus within the same GAB bus cycle as the request;

GAM requests with synchronous responses include:
REQ_RX
REQ_BUF
REQ_TX
NXT_BUF
DEQ_PKT
DEQ_ENT
RD_QSR
RD_RSR
RD_GAM
WT_GAM Currently, there is no GAM request requiring an asynchronous response.

4.7 Packet Types

There are three different types of packets supported in the generic high bandwidth adapter: type 1, type 2, and type 3 packets. These three types of packets receive almost identical treatment from the GAM except at the end of packet transmission.

For type 1 packets, at the end of packet transmission (END_TX), the GAM will automatically release the packet and all the associated buffers to the free pool. The intention in supporting type 1 packets is to reduce the P overhead on connectionless packets.

For type 2 packets, at the end of packet transmission (END_TX), packet buffers will not be automatically returned to the free buffer pool. This will only occur when the GAM receives a REL_PKT request. When this happens, the packet and all the associated buffers will be returned to the free pool after the packet transmission is complete.

For type 3 packets, at the end of packet transmission (END_TX), the GAM will automatically enqueue the packet to the end of the current packet queue. The intention in supporting type 3 packets is to reduce the P overhead associated with repetitive circular packet processing such as the claim and beacon packets in the FDDI network.

4.8 Traffic Types and Control

The generic high bandwidth adapter supports three types of communication traffic: urgent, synchronous, and asynchronous. To support synchronous traffic, the adapter must be able to guarantee synchronous traffic bandwidth and storage. The policy the adapter adopts to guarantee synchronous bandwidth is to limit asynchronous traffic flowing into the adapter. The policy works as follows:

As mentioned in chapter 3.0, Packet Memory (PM) & Controller, the PM in the adapter is organized in buffers. During adapter initialization, all the buffers are initialized to be free buffers. Synchronous traffic packets are allowed to use as many free buffers as needed. On the other hand, asynchronous traffic packets can only use up to a specified number of free buffers—this is the asynchronous buffer threshold, which is programmable by the P. This policy is enforced by the GAM in the following way:

When a PMI receives an incoming packet or when the P needs to generate a new packet, it will issue the GAM primitives REQ_RX and/or REQ_BUF to request free buffers from the GAM. If there are free buffers available, the GAM will give the first free buffer to the buffer requester.

If there is no free buffer available, the buffer request will be denied and the PMI or the P will receive a null buffer pointer. In this situation, the PMI or the P will either flush or block the data transfer immediately.

The GAM also keeps an internal free buffer counter. This counter indicates the total number of free buffers currently available in the adapter. During initialization, the free buffer counter is set to be equal to the total number of buffers in the adapter. Every time a REQ_RX or a REQ_BUF primitive is received, the counter will be decreased by one. Every time a packet is freed, the counter will be increased by the packet buffer count. If the counter drops below a predefined free buffer threshold value, which is also programmable by the P, the GAM will activate a GAB bus signal line called BELOW, indicating "free buffer below threshold." When this happens, the P and PMIs shall either adopt the "short packet reception policy" or temporarily reject any further packet reception until the buffer congestion is relieved (see the "Buffer Congestion Relief" discussion in the following paragraph).

If a PMI or the P receives all the buffers it needs from the GAM and completes the packet data transfer to the PM, it will issue a GAM primitive, ENQ_PKT/R, to put the packet into the target queue. When the GAM receives the ENQ_PKT/R request, it will enqueue the packet into the target queue. If the traffic type of the enqueued packet is synchronous, no further processing will be performed. On the other hand, if it is asynchronous traffic, the GAM will accumulate the packet buffer count into another buffer counter in the GAM, the asynchronous buffer counter. If the asynchronous buffer counter exceeds the threshold value, the GAM will activate another GAB bus signal line called ABABV, indicating "asynchronous buffer above threshold," to inform the P and all PMIs about this situation. When this happens, the P and PMIs shall reject any further incoming asynchronous data transfers.

Urgent traffic packets will be treated the same as synchronous traffic packets by the GAM in terms of buffer allocation. However, when the GAM receives an ENQ_PKT (ENQ_PKT/R or ENQ_PKT/N) primitive with the urgent traffic type, it will enqueue the packet from the head, instead of tail, of the corresponding queue. In this way, urgent traffic may receive fast response time.

Architecture Note—Buffer Congestion Relief

When the adapter runs into a buffer congestion situation, a GAB bus signal line, BELOW, will be activated. If the buffer congestion is due to an excessive volume of inbound traffic, the adapter link layer software has an option to send a "local busy" packet to remote stations and request packet transmission to halt. If the buffer congestion is due to an excessive number of unacknowledged transmission packets, the adapter code can explicitly solicit acknowledgement by turning ON the packet polling bit (demand polling) after sending the "local busy" indication to the remote stations. When the remote stations receive the demand polling signal, they have to send explicit acknowledgement packets to acknowledge the packet reception. These explicit acknowledgement packets tend to be short packets for most known link layer protocols. When these acknowledgement packets arrive in the adapter, the PMI needs to implement the short packet reception policy (i.e. only short packets will be received) to move these packets into PM to be processed by the P.

The GAM primitive, FLUSH (flush packet), can be utilized by the PMI to implement the short packet reception policy during the buffer congestion situation in the following way:

When there is an incoming packet addressing the adapter port, the PMI in that adapter port will issue the REQ_RX primitive to the GAM and receive a free buffer pointer.

After receiving a free buffer pointer, the PMI can start moving the received packet into the allocated free buffer starting from the predefined buffer offset.

If the incoming packet reception is complete before the packet data movement reaches the end of the allocated buffer (i.e. the received packet length is less than the difference between the buffer size, 256 bytes, and the buffer offset), the PMI can issue the ENQ_PKT/R primitive to enqueue this received short packet to the PM.

On the other hand, if there is more data that needs to be received in the incoming packet when the PMI hits the buffer boundary, the incoming packet will not be considered as a short packet. In this situation, the PMI can issue a FLUSH primitive to the GAM and discard this incoming packet or it can just reuse the buffer for the next packet.

With the combination of the short packet reception policy, demand polling, and local busy indication, buffer congestion can be relieved in many applications.

4.9 Multicast Packet Feature Support

The generic high bandwidth adapter must support the multicast packets used by many communication protocols. For example, if the adapter supports the data link layer, it must be able to process global SAP (Service Access Point) or group SAP packets. When the adapter receives a global/group SAP packet, it must send this packet to several different application layer programs, which may run on several different attached host systems. As another example, if the adapter is configured to be a network router, when it receives a routing broadcast packet, it sends this packet to all the attached networks except the source of the original multicast packet.

There are two possible approaches with which the generic high bandwidth adapter can support this multicast packet feature. One is in a "sequential" manner and the other is in a "parallel" manner.

in a sequential manner—

When the P receives a multicast packet, it can set up a loop and start the packet transmission to intended destination #1. When the packet transmission to destination #1 is complete, the P would, then, transmit the packet to the intended destination #2. This process would be repeated until the packet transmission to all the intended destinations is complete.

The drawbacks of this approach are that it is slow, has a large variance in delivery time, and consumes a lot of P processing cycles.

in a parallel manner—

When the P receives a multicast packet, it makes several copies of the original packet and transmits the duplicate packets to all the intended destinations simultaneously. This approach has faster response time, a smaller variance in delivery times, and potentially requires much less P processing. However, duplicating the packet can be very costly without hardware support.

The following is a scheme in which the P and the GAM interact to support the multicast packet feature in the adapter:

when the P dequeues a multicast packet from the GAM, it issues a REQ_RX and a REQ_BUF to get a packet and a buffer pointer from the GAM for each duplicate packet the P needs to create;

when the P receives the buffer pointer from the GAM (for each duplicate packet), it writes the packet header and copies the content of the first buffer of the original multicast packet into the buffer just received from the GAM.

After that, the P can issue an ENQ_PKT/R to enqueue the duplicate packet into the destined output queue. However, when the P issues the ENQ_PKT/R, it needs to inform the GAM about the first buffer pointer in the original multicast packet so the GAM knows how to link the first buffer in the duplicate packet to the remaining buffers (starting from the second buffer) of the original multicast packet (see the discussion in section 4.5.5, ENQ_PKT/R—Enqueue Packet/Reception).

The above process will be repeated until all the duplicate packets are created and enqueued to the output queues; After that, the P has the following possible scenarios to dispose of the original multicast packet:

If the adapter is in a configuration such that the packet transmission sequence can be guaranteed, the P just enqueues the original packet as the last duplicate packet out.

On the other hand, if the adapter is in a configuration such that the packet sequence cannot be guaranteed, the P can elect to enqueue each duplicate packet as a type 1 packet (which will be automatically released at the end of packet transmission) and not to enqueue the original multicast packet at all. The only thing the P will do after all the duplicate packets are enqueued is to set up a waiting timer and let the timer expire. When the timer expires, the P will release the original multi cast packet.

The exposure of this scheme is that if the waiting timer is set too short, the original multicast packet can be released before the last few duplicate packets are transmitted. When this situation happens, the data integrity on the last few duplicate packets cannot be guaranteed.

If the adapter is in a configuration that the packet sequence cannot be guaranteed and the P still wants to guarantee packet data integrity, it can elect to enqueue each duplicate packet as a type 2 packet (which will not be automatically released at the end of packet transmission) and not to enqueue the original multicast packet at all. After all the duplicate packets are enqueued, the P can periodically poll the status of each duplicate packet. Since the duplicate packets were enqueued as type 2 packets, the only thing the GAM will do to a type 2 packet after it is transmitted is to change the packet state to "leased." By using the GAM primitive, RD_GAM, the P checks the packet state of each duplicate packet. After all duplicate packets' states are changed to "leased," the P can release the original multicast packet along with all the duplicate packets.

Figure 3:
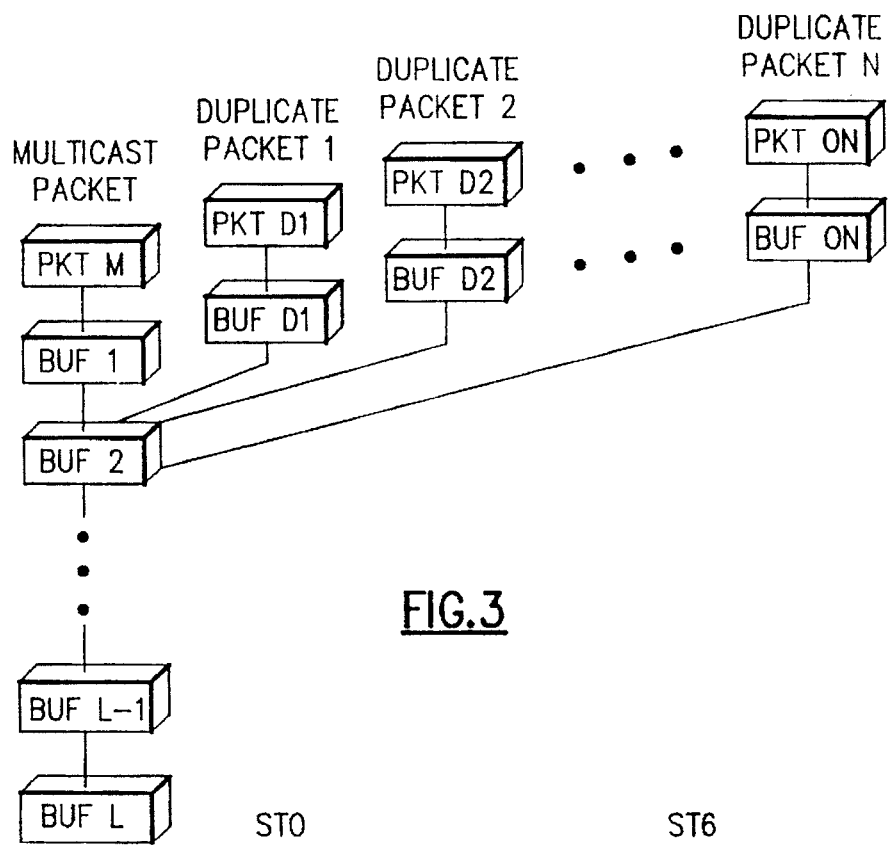
FIG. 3 illustrates the structure of multicast packets in the generic adapter manager.

FIG. 3 shows the structure of multicast packets in the GAM. The original multicast packet is made of PTE #M pointing to the first buffer (BUF #1), then, to the second buffer (BUF #2), then, to the third buffer; etc., and finally to the last buffer (BUF #L) in the multicast packet. The first duplicate packet is made of PTE #D1 pointing to its own first buffer (BUF #D1), and, then, to the second buffer (BUF #2) of the original multicast packet. The second duplicate packet is made of PTE #D2, BUF #D2, and, then, to BUF #2. And, finally, the last duplicate packet is made of PTE #Dn, BUF #Dn, and, then, to BUF #2.

4.10 Multiple interleaved Concurrent Packet Transmission/Reception

There are applications in which the P or an adapter port needs to transmit or receive multiple interleaved concurrent packets at the same time. For example, there can be several data link layer threads running simultaneously in the P and multiple link layer threads can engage in the creation of response packets at the same time; from the time span point of view, that means that multiple new packet creation processes are interleaved in the P. As another example, an adapter port design may require one packet transmission (REQ_TX) for each output queue it serves and may every prefetch part of the data from each transmitted packet into its own internal buffers in order to reduce the transmission latency. When this adapter port is allowed to transmit (by the network protocol), it can make a quick decision about which packet to send out and start the packet transmission immediately.

To support multiple interleaved packet transmission/reception for the P and each PMI inside the adapter, a piece of information called "Request Identification" has to be exchanged between the GAM and the P or the PMI. When the P or the PMI is ready to receive a packet, it needs to generate a request identification and pass this information to the GAM as a part of REQ_RX primitive. Any subsequent buffer allocation (REQ_BUF) for this packet reception will also need to carry this information. From this request identification, the GAM will be able to link all the buffers belonging to the same packet together. In this way, multiple interleaved packets can be received by the P or the PMI as long as the P or the PMI can supply the correct request identification to the GAM.

This mechanism can also be used for multiple interleaved packet transmission, and the request identification needs to be passed along in each REQ_TX, NXT_BUF, and END_TX primitive flowing between the GAM and the PMI.

The architecture currently defines the maximum number of packet in transmission and reception in the P and each PMI to be eight (i.e. eight concurrent transmitted packets and eight concurrent received packets for each P or PMI).

4.11 GAM State Machine—Packet Life Cycle

Figure 4:
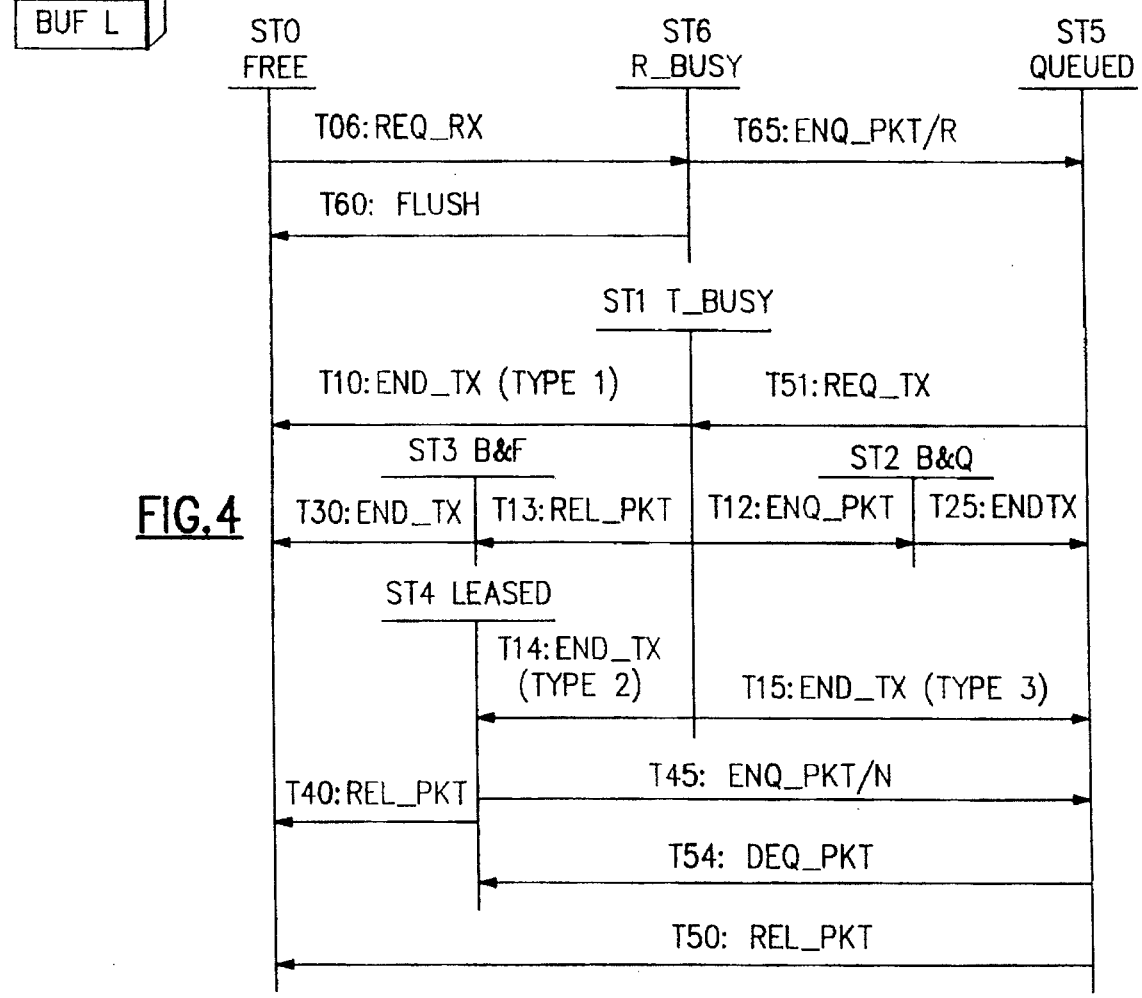
FIG. 4 shows the major states in which a packet can exist in a generic adapter manager state machine.

This section describes the core of the GAM state machine—packet life cycle (see FIG. 4). There are five major states and two substates in which a packet can exist in the GAM state machine; these states are:

1. Free Packet

State Description

When a packet is in the "Free Packet" state, it belongs to the GAM only. All the free packets belonging to the GAM will be linked together and pointed to by the free packet pointer. During adapter initialization, all the adapter packets are initialized to the free packet state.

State Entry from any state with a RESET signal;

T50: from the "Queued Packet" state with a REL_PKT request;

T40: from the "Leased Packet" state with a REL_PKT request;

T60: from the "RX Busy Packet" state with a FLUSH request;

T10: from the "TX Busy Packet" state with an END_TX request for type 1 packets only;

T30: from the "Busy & Freed Packet" state with an END_TX request;

State Transition

T06: to the "RX Busy Packet" state with a REQ_RX request;

2. TX Busy Packet

State Description

When a packet is in the "TX Busy Packet" state, it means that a PMI has ownership of the packet and is currently working on moving the packet data out of the PM. When the packet movement is complete, the PMI is expected to generate an END_TX request to the GAM as an indication of task completion.

When a packet is currently being used by a PMI for packet movement, it will not change packet state. On the other hand, if an ENQ_PKT/N request or a REL_PKT request is received from the P in the "TX Busy Packet" state during packet transmission, the GAM should service the request immediately without slowing down the requestor. To facilitate this speed-up, two substates are created in the GAM state machine to handle the TX busy packet ENQ_PKT/N and REL_PKT requests from the P during packet transmission. For details, see the "BUSY AND FREED PACKET" and "BUSY AND QUEUED PACKET" state descriptions.

State Entry

T51: from the "Queued Packet" state (and head of queue) with a REQ_TX request;

State Transition

T12: to the "Busy & Queued Packet" state with an ENQ_PKT/N request from the P during packet transmission (i.e. after REQ_TX);

T13: to the "Busy & Freed Packet" state with a REL_PKT request from the P during packet transmission (i.e. after REQ_TX);

T15: to the "Queued Packet" state with an END_TX request after a packet transmission for type 3 packets;

T14: to the "Leased Packet" state with an END_TX request for type 2 packets only;

T10: to the "Free Packet" state with an END_TX request for type 1 packets only;

3. Busy and Queued Packet

State Description

The "Busy and Queued Packet" state is one of the two TX busy packet substates designed to provide the speed-up described in the "TX Busy Packet" state description. When an ENQ_PKT/N request is received from the P in the "TX Busy Packet" state during packet transmission, the GAM will change the packet state from "TX busy" to "Busy and Queued" and enqueue the packet into the requested queue without waiting for the completion of packet movement. Later on, the PMI is expected to generate an END_TX request to indicate the completion of packet movement. When the GAM receives the END_TX request from PMI, it merely changes the packet state from "Busy and Queued" to "Queued".

State Entry

T12: from the "TX Busy Packet" state with an ENQ_PKT/N request from the P during packet transmission (i.e. after REQ_TX);

State Transition

T25: to the "Queued Packet" state with an END_TX request;

4. Busy and Freed Packet

State Description

The "Busy and Freed Packet" state is the other "TX Busy Packet" substate designed to provide the speed-up described in the "TX Busy Packet" state description. When a REL_PKT request is received from the P in the "TX Busy Packet" state during packet transmission, the GAM will not be able to release the packet immediately because a PMI is processing it. Instead, the GAM will just change the packet state from "TX Busy" to "Busy and Freed". Later on, when packet movement is complete, the GAM will receive an END_TX request from a PMI. Only when the END_TX request is received will the GAM perform the "release" packet operation, i.e. change the packet state from "Busy and Freed" to "Free" and release the packet and all the associated buffers to the free pool.

State Entry

T13: from the "TX Busy Packet" state with a REL_PKT request from the P during packet transmission (i.e. after REQ_TX);

State Transition

T30: to the "Free Packet" state with an END_TX request;

5. Leased Packet

State Description

When a packet is in the "Leased Packet" state, it belongs to the P but it is not enqueued in any queue.

State Entry

T54: from the "Queued Packet" state with a DEQ_PKT request;

T14: from the "TX Busy Packet" state with an END_TX request for type 2 queues only;

State Transition

T45: to the "Queued Packet" state with an ENQ_PKT/N request;

T40: to the "Free Packet" state with a REL_PKT request;

6. Queued Packet

State Description

When a packet is in the "Queued Packet" state, it is enqueued in a queue.

State Entry

T45: from the "Leased Packet" state with an ENQ_PKT/N request;

T65: from the "RX Busy Packet" state with an ENQ_PKT/R request during packet reception;

T15: from the "TX Busy Packet" state with an END_TX request after a packet transmission for type 3 packets;

T25: from the "Busy & Queued Packet" state with an ENQ_TX request;

State Transition

T54: to the "Leased Packet" state with an DEQ_PKT request;

T50: to the "Free Packet" state with a REL_PKT request;

T51: to the "TX Busy Packet" state with a REQ_TX request;

7. RX Busy Packet

State Description

When a packet is in the "RX Busy Packet" state, it means a PMI or the P has ownership of the packet and is currently working on moving the packet data into the PM. When the packet movement is complete, the P or the PMI is expected to generate an ENQ_PKT/R request to the GAM as an indication of task completion.

State Entry

T06: from the "Free Packet" state with a REQ_RX request;

State Transition

T65: to the "Queued Packet" state with an ENQ_PKT/R request;

T60: to the "Free Packet" state with a FLUSH request;

4.12 Event Control

When an event in an adapter port occurs which requires the exchange of a small segment of data to be communicated with the P, the PMI associated with that port will issue an ENQ_ENT primitive to the GAM. When the GAM receives an ENQ_ENT request, it will store four bytes of event data in the enqueue request in the next available entry in the GAM FIFO dedicated to event processing. If the event FIFO is half-filled as the result of the ENQ_ENT operation, a GAB signal called "Event FIFO Half Full" EF_HF, will be activated. This EF_HF signal may be used by the P subsystem to generate an interrupt to the P.

Through either the interrupt scheme or polling scheme, the P can be notified and, then, read the event data from the GAM's FIFO whenever it is ready to process events. The P may continue its event processing until either the FIFO becomes empty or it has other higher priority work to do.

4.13 Generic Adapter Bus Arbiter

In addition to all the buffer, packet, and queue support functions, the GAM will also act as the GAB arbiter. The GAM contains the logic to support the GAB arbitration logic. For details about the GAB priority scheme and bus request/grant process, refer to chapter 6.0, Generic Adapter Bus (GAB).

4.14 Generic Adapter Bus Monitor

To insure the data integrity inside the adapter, a one-bit-per-byte odd-parity scheme is used on both data and address in the GAB. The GAM checks the parity for each GAB bus operation regardless which two adapter components are involved in the bus operation.

As will be mentioned in chapter 6.0, Generic Adapter Bus (GAB), the bus operations on the GAB are non-preemptive. For fairness of bus utilization, the adapter needs a mechanism not only to be able to set a limit on how long each GAB bus master can hold the bus for each bus request, but also to enforce fairness when one of the bus masters does not behave.

Because of these two requirements, the GAM is the logical component in the adapter to perform these GAB monitoring functions. The following shows how the GAM can support the GAB monitoring functions:

for parity checking:
   Every time there is an operation on the bus, the GAM will check both data parity and address parity. If the GAM detects a parity error, a signal on the GAB called the bus error (-BERR) will be activated by the GAM.

for bus fairness:
   Every time the bus is granted to a bus master, the GAM will start a counter to count the bus cycles. If the bus master does not release the bus after a certain number of bus cycles, the GAM will assert the bus error signal (just as in the parity error situation). The limit of bus cycles in the GAM can be programmed by the P by using the WT_GAM primitive.

When the bus error signal is activated, all the adapter components including the GAM itself shall abort any ongoing processing. At the same time that the bus error signal is activated, the GAM will also log the bus address, bus master, and the cause of the bus error in its internal storage. This information can be retrieved later on by the P (using the RD_GAM primitive) if error isolation and recovery is desired.

5.0 Queue Scheduling And Notification

The generic high bandwidth adapter is logically organized into Packet Queues and Servers. The Packet Queues accept packets, hold them and release them from/to PMIs and the P. The PMIs and the P act as the queue servers.

In the generic high bandwidth adapter, there are PMI Modules (FMI0 to PMIN) which communicate with other parts of the adapter. Each PMI Module has its own set of outbound queues. These outbound queues are assigned by the P during adapter initialization and do not have to be mutually exclusive, i.e. an adapter outbound queue can belong to two different PMIs and can be serviced by two queue servers simultaneously. In addition, each PMI can enqueue inbound packets and service its outbound queues simultaneously, i.e. a PMI can intermix packet transmission and reception and the CAM supports this full-duplex capability.

The P in the generic high bandwidth adapter also has a set of queues and they are called inbound queues. Like the PMI, the GAM also supports the full-duplex capability in the P, i.e. the P can enqueue packets and service its inbound queues at the same time.

When packets arrive, a PMI will, first, enqueue arriving packets into the P inbound queues. Then, the P will dequeue, process, and enqueue packets into the PMIs' outbound queues. And finally, the PMI will dequeue the processed packets from its outbound queues.

It is also possible that a PMI will enqueue packets into another PMI's outbound queues directly. In this case, there will be no P processing and the PM is used as temporary storage.

Every queue in the adapter can be in one of following states: Empty or Nonempty. All packet queues are stored in the GAM's internal storage and managed by the GAM.

In this chapter, the queue scheduling and notification mechanism will be discussed. However, since the queue serving policy implementation is application dependant, there will be no discussion of the queue serving policy in this report.

5.1 Queue status Notification Mechanism

For the most efficient usage of the queue servers' resources, the GAM must employ a mechanism to inform the servers about the queue set status. Because of the different nature of a PMI (dedicated state machine) and the P (general purpose processor), the GAM applies different notification mechanisms to different queue servers.

Outbound Queues:

server—PMIs;

Server Nature—dedicated;

One of the most important functions performed by a PMI is to move the packet data in to and out of the PM at high speed and the PMI are dedicated to this function.

Server Objective—fast service response time;

Since each PMI is a dedicated server to the outbound queues, its main objective is to process the outbound packets in the outbound queues as soon as possible for low adapter latency.

Notification Mechanism—Whenever a queue's status gets changed, the GAM generates a "pulse" on a GAB bus signal line called QSRC, Queue status Register Change, and passes the most significant bits of the queue address information on the GAB bus. The queue address information is carried by three GAB bus lines, QA0, QA1, and QA2.

Queue status Presentation—Queue Status Register

The GAM will maintain a queue status register internally. The length of this queue status register is equal to the number of queues in the adapter, one bit for each queue. When a bit in this register is "ON," it means there is at least one packet in the corresponding queue waiting to be served.

If the bit is "OFF," the queue is empty. Every time a queue's status gets changed, the GAM will generate a pulse on the bus signal line, QSRC, and put the queue address information on QA0, QA1, and QA2. QA0, QA1, and QA2 are used as address lines to indicate which queue has had a status change. If QA0, QA1, and QA2 are all zeros, it indicates that one of the first 32 queues in the adapter has changed status. If QA0, QA1, and QA2 are equal to 0, 0, and 1, it indicates that one of the second 32 queues in the adapter has changed status, etc.

Server Reaction after Notification—

When a PMI senses time pulse on the QSRC line, it can compare the queue address information on the bus with its own queue set identification. If the information matches, the corresponding PMI can issue a GAM primitive, RD_QSR (read queue status register), to determine which queues have packets for processing and starts its queue packet processing by issuing another GAM primitive, REQ_TX;

Inbound Queues:

Server—the P

Server Nature—non dedicated;

In addition to serving all the adapter inbound queues, the P needs to run the communication code and perform the communication functions. The P cannot totally dedicate itself to serving the inbound queues.

Server Objective—balance between fast service response time and efficient usage of the P's resources;

Because of the precious nature of the P resources and the overhead associated with interrupting the P, it is undesirable to interrupt the P for every inbound packet arriving in the adapter inbound queues. On the other hand, each inbound packet in the inbound queue deserves immediate attention from the P for the fast packet response time. To balance these two requirements, the GAM implements the inbound queue server notification mechanism based on the following two parameters: Elapsed Time and Packet Count. Packet count is "the total number of packets currently in all of the inbound queues" and Elapsed Time is defined to be "time elapsed since last reset when there was at least one packet in the inbound queues."

Notification Mechanism—QSRC/QA0-QA2 or an interrupt generated by the GAM to the P when one of the following situations happens:

Timer Expires—the elapsed time reaches the predefined time-out value; this predefined time-out value can be programmed by the P with the GAM primitive, WT_GAM;

Threshold is Exceeded—the packet count exceeds the predefined packet threshold value; this predefined threshold value can also be programmed by the P with the GAM primitive, WT_GAM;

Queue status Presentation—Queue status Register

Same as the outbound queue status presentation.

Server Reaction after Notification—

When the P receives the interrupt from the GAM, it can turn ON its interrupt inhibit bit and read the queue status register. Based on the information in the queue status register, the P can implement its own queue serving policy. The P can start serving queues by issuing a DEQ_PKT request to the GAM with a queue identification. When the GAM receives a DEQ_PKT request, it will dequeue the first packet in the requested queue, decrease the packet count by one, and update the queue status register accordingly. When the P receives the packet identification from the GAM (after the DEQ_PKT request), it can start processing the packet according to its programmed communication layer functions. When the packet processing is complete, the P can read the queue status register again and repeat the above process until either the all inbound queues become empty or the P has to terminate the processing because of some other higher priority requirements. When the P completes (or terminates) the queue service, it may turn OFF its interrupt inhibit bit to allow for further queue notifications from the GAM.

5.2 Data/Control Flow Example

In this section, a step-by-step event sequence from the time a new packet is received at PMI 1 to the time a packet is sent out through PMI 2 is described.

1. PMI 1 requests a buffer from the GAM. If no buffers are available, PMI 1 flushes this transfer (and the GAM will release any allocated buffers in the PM in the meantime).

If buffers are available, PMI 1 stores data into the PM until the buffer is filled. At that moment, PMI 1 requests another new buffer from the GAM. The process continues until a complete packet has been stored in the PM. In the meantime, if the free buffer counter drops below the threshold value, the GAM will activate a bus signal line called BELOW to inform the P and all the PMIs about this situation. When a PMI receives this signal, it can temporarily hold its packet reception until the buffer congestion is relieved.

2. PMI 1 sends an enqueue packet request to the GAM. If this request causes the asynchronous buffer counter to exceed the threshold, the GAM will activate a bus signal line, ABABV (asynchronous buffer above threshold). In this situation, PMIs can elect to reject any subsequent asynchronous packet transfer.

3. If the packet is enqueued to an inbound queue, the GAM will first increase the inbound queue packet count by one and, then, check if this is the only packet in all the inbound queues. If this is the first packet in the inbound queues, the GAM will immediately start an inbound queue timer.

4. If the inbound queue timer expires or the inbound queue packet count exceeds the threshold limit, the GAM will generate an interrupt to the P.

5. When the P is notified, it will first turn ON its interrupt inhibit bit and read the Queue Status Registers. The P finds out which queues are nonempty and schedules the work to be done according to queue priorities. Every time the P dequeues an inbound packet, the GAM restarts the inbound queue timer.

6. The P dequeues packets from the highest priority nonempty queue until the queue becomes empty. At that moment, it proceeds to dequeue packets from the next highest priority nonempty queue.

If new packets arrive and the packet count exceeds the threshold, or the timer expires, the GAM will notify the P again.

7. The P, during packet processing, can also request buffers from the GAM to generate new outbound packets.

The P, after processing packets, will request to enqueue the packets to a queue served by PMI 2. When the GAM receives this enqueue request, it will update the queue status register accordingly. If the result of this enqueue causes the state of an outbound queue to change from empty to nonempty, the GAM will notify all the PMIs by generating a pulse on the QSRC line and put the queue address information on QA0, QA1, and QA2.

8. PMI 2, upon the reception of a pulse on QSRC, can read the queue status register and find out which queues are nonempty. PMI 2 can start serving the outbound queues according to its own serving policy and the information in the queue status register.

6.0 Generic Adapter Bus (GAB)

The GAB is a synchronous bus because all the bus signals are synchronized to a bus clock called BCLK. However, the bus operations are asynchronous because the "response" to a bus "command" can be returned on the edge of any BCLK cycle. Data movement on the GAB is accomplished through signal exchange on the data and address buses using a command/response handshake mechanism. A typical read/write bus operation will take two or more BCLK cycles depending on how fast a bus slave can return the response. In order to support high speed data movement, a signal called "Stream Mode" (−SM) is defined in the GAB to be used by a bus slave to indicate to a bus master its capability to support "stream mode" operations. When stream mode is established on the GAB, it takes only one additional BCLK cycle to complete each additional 32-bit data movement. In addition, the stream mode signal can be used by a slow bus slave to allow pipelined read operations.

Besides data movement signals, the GAB contains other bus signals to to support the following functions:

Bus Mastership Request/Grant Process

Interrupt Requests

Bus Error Indication

Queue status Change Indication

Bus Slave Response Valid Indication

GAM Busy Indication

Packet Memory Buffer Status Indication 6.1 Bus Signals

Bus Clock: BCLK single source;

driven by the bus clock generation logic;

all other bus signals synchronized with BCLK;

Data Bus: D00 to D31 tri-state;

positive logic;

terminated high;

driven by bus master during write cycle;

driven by bus slave during read cycle;

D00 is the least significant bit; D31 is the most significant bit;

Data Parity: PD0 to PD3 odd parity;

tri-state;

positive logic;

terminated high;

PD0 for D00-D07;

PD1 for D08-D15;

PD2 for D16-D23;

PD3 for D24-D31;

Address Bus: A02 to A25 tri-state;

positive logic;

terminated high;

always driven by bus master;

A02 is the least significant bit; A25 is the most significant bit;

Address Space Partition Implementation:

| A25 | A24 | A23 | |
|---|---|---|---|
| 0 | 0 | — | Processor Address Space |
| 0 | 1 | 0 | Unused Address Space |
| 0 | 1 | 1 | GAM Addressing Space |
| 1 | 0 | — | Packet Memory Address Space |
| 1 | 1 | 0 | Adapter Port Address Space |
| 1 | 1 | 1 | GAM Addressing Space |

Address Parity: PA0 to PA2
odd parity;
tri-state;
positive logic;
terminated high;
PA0 for A02-A09;
PA1 for A10-A17;
PA2 for A18-A25;
Byte Enable: BE0 to BE3
These four lines are used by the bus master to control the individual byte selection on the addressed location. BE0 controls the least significant byte selection and BE3 the most significant byte. With these four selection bits, the bus master can have byte-wide, halfword-wide (16 bits), and word-wide (32 bits) addressing on the selected location.
tri-state;
active high;
terminated high;
driven by the bus master;
for individual byte selection;
Byte Enable Parity: BEP
odd parity for BE0-BE3;
tri-state;
positive logic;
terminated high;
Command:–CMD
tri-state;
active low;
terminated high;
driven by the bus master;
for read operations: address bus will be valid in the BCLK cycle that –CMD is asserted;
for write operations: both data and address buses will be valid in the BCLK cycle that –CMD is asserted;
Read/–Write: R/–W
tri-state;
low for write cycle, high for read cycle;
terminated high;
driven by the bus master;
will be valid in the same BCLK cycle that –CMD is asserted;
Response: –RESP
tri-state;
active low;
terminated high;
driven by the bus slave;
bus operation complete acknowledgement;
for read operations: data bus will be valid in the BCLK cycle that –RESP is asserted;
Bus Request: –BR0 to –BRN
These request lines are used by bus masters to contend for the bus mastership. –BRN is the request line for the P. –BR0 is the request line for PMI0, –BR1 for PMI1, etc.
direct drive;
active low;
terminated high;
driven by the bus master;
received by the bus arbiter (in the GAM);
for bus mastership contention;
Bus Grant: –BG0 to –BGN
These bus grant lines are used by the bus arbiter to grant bus mastership to the bus contender. –BGN is the bus grant line for the P and –BG0 is for PMI0, –BG1 for PMI1, etc. When the bus master wins the bus contention and receives bus mastership from the bus arbiter, it can start its operation at the next cycle.
direct drive;
active low;
terminated high;
driven by the bus arbiter;
received by the bus master;
for bus mastership grant;
Bus Busy: –BUSY
This signal is used by the bus master to indicate the bus busy status. When the bus master wins the bus contention and receives the bus grant from the bus arbiter, it can start its operation by activating the –BUSY signal. When the current bus master completes its operation, it can release the –BUSY signal to indicate the end of bus mastership. At this time, the bus arbiter can grant the next bus mastership to other bus contenders.
tri-state;
active low;
terminated high;
driven by the bus master;
for bus busy status;
Bus Error: –BERR
This signal is to indicate that there is an error (detected by the GAM) in the current bus operation.
direct drive;
active low;
terminated high;
driven by the GAM;
for bus error status indication;
Queue status Register Change & Address: QSRC, QA0 to QA2
These status lines are used by the GAM to notify the queue servers, the P and PMIs, that there is a change in their queue status registers. Whenever there is a change in one of the queue status registers, the GAM will assert the QSRC line for one bus cycle and pass the address of the changed queue in QA0 to QA2.
direct drive;
when activated, queue status register has changed;
driven by the GAM;
QA0 is the least significant bit; QA2 is the most significant bit;
received by queue servers—the P and PMIs;
for queue status register change indication;
Interrupt Request: –INT0 to –INTN+1
These interrupt request lines are used by the interrupt sources, the GAM, PMIs and the PM memory controller, to request the attention of the P.
Whenever an interrupt source needs the attention of the P, it can raise its interrupt request line and the interrupt request line will stay high until the reason for interruption is cleared by the P. −INTN+1 is the interrupt request line from the PM memory controller; −INTN is the interrupt request line from the GAM; −INT0 is from PMI0; −INT1 from PMI1, etc.

direct drive;

active low;

terminated high;

driven by the interrupt source—the GAM, PMIs, the PM controller;

received by the P;

Stream Mode: −SM

This signal is used by the bus slave to indicate to the bus master that it is ready for stream mode operation.

tri-state;

active low;

terminated high;

driven by bus slave;

for stream mode operation;

Response Valid: −RV0 to −RVN-1

These status lines are optional and are designed to support direct control operations on slow adapter ports. When a bus master accesses a slow port, it may take a while for −RESP to return. In the meantime, the GAB is idle and no other bus operations are allowed to take place. With this response ready line, the port logic has the option to implement the following mechanism:

When the bus master addresses an adapter port, the adapter port can latch the request and return −RESP immediately.

Next, the adapter port can perform the requested operation, which was latched in the previous bus cycle, with its internal logic.

When the requested operation is complete and the response is ready, the adapter port can assert this response ready line on the bus.

When this response ready line is activated, the previous bus master can perform another bus operation to read the response if it elects to.

−RV0 is the response ready line for PMI0 and −RV1 for PMI1, etc.

direct drive;

active low;

terminated high;

driven by the PMIs;

Free Buffer Low: BELOW

Whenever the free buffer pool drops below a certain threshold, the GAM will activate this status line as an indication. This line is monitored by PMIs or the P. When this line is active, PMI may elect to discard long incoming packets.

direct drive;

active high;

driven by the GAM;

monitored by PMIs or the P;

for low free buffer pool indication;

Asynchronous Buffer Above: ABABV

Whenever the number of buffers allocated for asynchronous traffic reaches the threshold, the GAM will assert this line as an indication. This line is monitored by PMIs or the P. When this line is active, PMIs may elect to discard incoming asynchronous packets.

direct drive;

active high;

driven by the GAM;

monitored by PMIs or the P;

for high asynchronous buffer indication;

Event FIFO Half Full: EF_HF

Whenever the event FIFO in the GAM is half-filled, the GAM will assert this line as an indication. This line may be used by the P as an indication to process the events as soon as possible.

direct drive;

active high;

driven by the GAM;

monitored by the P;

for event FIFO half full indication;

Reset: RESET

This is the adapter master reset. When this line is activated, all the adapter components will be reset. This line is activated by power on reset and the P. The duration for this signal is guaranteed to be 20 u seconds or longer.

direct drive;

active high;

driven by power on reset or the P;

monitored by all adapter components;

adapter master reset;

GAM Busy: −GBUSY

This status line is used by the GAM to express its internal status to other components on the bus, i.e. the P and PMIs. When activated (low), it indicates that the GAM is currently engaged in a GAM operation and cannot accept any further GAM request. Bus masters that need service from the GAM will monitor this line. Bus masters requesting a GAM operation can only make bus requests when this line is deactivated. When one of the bus masters wins the bus contention and receives the bus grant, it can put its GAM requests on the bus and release the bus when the bus cycle is complete. The moment the GAM receives a GAM request, it will activate −GBUSY. Those bus masters that did not win the bus contention and still need the GAM's services will withdraw their request for the bus (by deactivating their request lines) at the moment that they see −GBUSY going active. When the GAM completes the requested GAM operation and puts the asynchronous request status in the status register (if necessary), it will deactivate this busy line. At the moment −GBUSY is deactivated, those bus masters that still need GAM's services can make their bus requests again.

direct drive;

active low;

driven by the GAM;

monitored by the P and PMIs;

6.2 Bus Contention and Grant Process

When the P or one of the PMIs needs to access the GAB, it must first gain bus ownership. Each potential bus master in the generic high bandwidth adapter has an individual bus request line to the bus arbiter and the bus arbiter has individual bus grant lines to each potential bus master. During each bus cycle, the bus arbiter selects the bus winner from the asserted bus request lines. Each bus master monitors both the bus grant line and bus busy line. If a requesting bus master receives a grant during a cycle when bus busy line is not asserted, it can gain bus ownership by asserting bus busy. The bus arbiter also monitors the bus busy line and records the bus mastership winner for each bus contention cycle. This information is used to implement a round-robin bus priority scheme (as described in section 6.3, GAB Bus Priority Scheme) and as the log information when the bus error occurs (as described in section 4.14, Generic Adapter Bus Monitor).

6.3 GAB Bus Priority Scheme

The bus priority scheme adopted in the GAB combines the advantages of preprogrammed priority and round-robin fairness. During the adapter initialization, the P can decide which of the possible GAB bus masters will always have the highest bus priority, and the other bus masters will share the bus priority in a round-robin fashion on a cyclic basis. The default highest priority bus master is the P after the adapter is powered on. However, the P can change the highest priority bus master to any PMI by issuing a primitive to the GAM, WT_GAM.

The round-robin priority scheme works as follows: after the highest priority bus master is selected, each of the other four bus masters will be assigned a sequence number from 0 to 3; If the round-robin bus master X wins the bus contention on the current bus cycle, the bus priority (from the highest to the lowest) for the next bus cycle will be: the selected highest priority bus master, bus master (X+1) modulo N, bus master (X+2) modulo N, bus master (X+3) modulo N, . . . , and bus master X. On the other hand, if the selected highest priority bus master wins the bus contention in the current bus cycle, the priority for the next bus cycle will not change.

6.4 Bus Operation Scheme and Cycle Limitation

When a bus master wins bus ownership, it will assert the bus busy line, –BUSY, and start its bus operations. During the time period between the moment –BUSY is asserted and the moment that bus ownership is released voluntarily (–BUSY deactivated), the bus master owns the entire bus and no other bus master operations are allowed. This kind of bus operation is called non-preemptive. With this non-preemptive scheme, the number of BCLK cycles allowed per bus mastership must have a limit to avoid the starvation of other bus masters. The architecture does not define the maximum number of BCLK cycles allowed per mastership; Each individual implementation must define this time limit. This limit shall be programmable by the P using the GAM primitive, WT_GAM.

Any GAB bus master in the generic high bandwidth adapter shall voluntarily release its bus ownership before the limit is reached. If the limit is reached and busy busy (–BUSY) is still active, the GAM will assert the bus error (–BERR). When the bus error signal is asserted, all the adapter components shall abort any ongoing process and the P shall receive a nonmaskable interrupt.

6.5 Bus Operations and Cycle Timings

The following subsections will demonstrate the bus signal interaction and the timing of different bus operations.

6.5.1 Single Read/Write Operation

Figure 5:
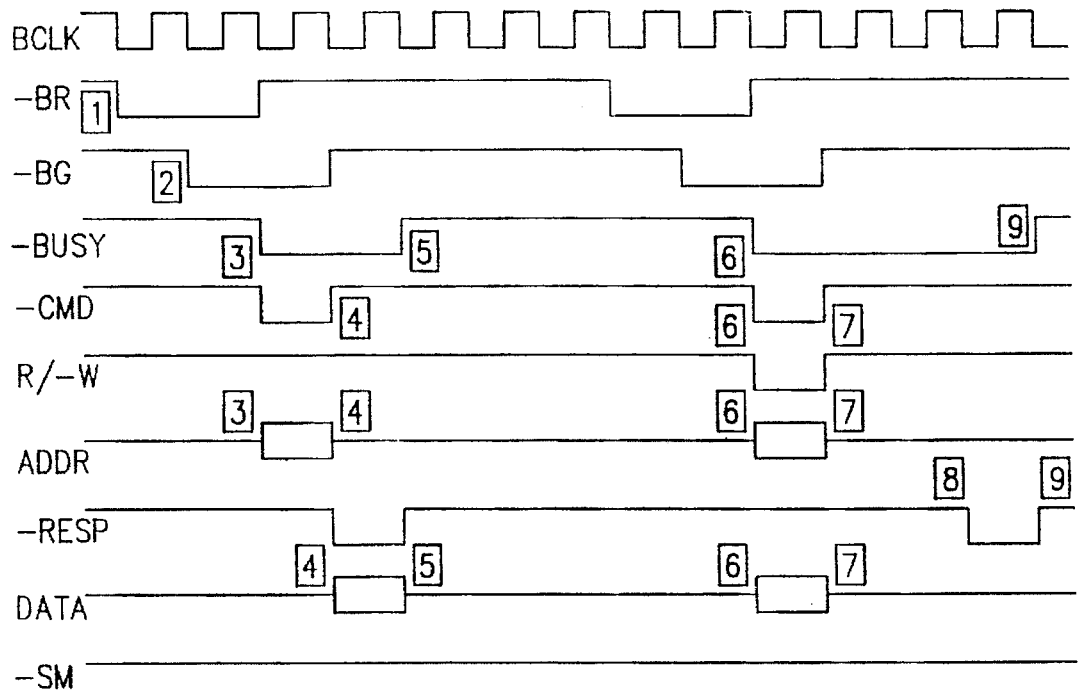
FIG. 5 illustrates the signal interaction of a single read and write operation.

FIG. 5 shows the signal interaction of one read operation and one write operation:

1. Bus Request—the bus master requests the bus;
2. Bus Grant—one cycle later, the GAM grants the bus ownership;
3. Operation Start—one cycle after the bus grant, the bus master asserts the bus busy line and starts a read operation by asserting the command line and putting the valid address on the bus;
4. Response Ready—the command and address lines will stay valid on the bus for only one cycle; during the next cycle, the bus slave completes the request, asserts the response, and puts the valid data on the bus;
5. Bus Release—the response and the data lines will stay valid on the bus for only one cycle; the bus master, in this example, has no more requests, it releases the bus by deactivating the bus busy line;
6. Another Operation Starts—after another cycle of the bus request and bus grant process, the bus master receives the bus mastership again; it activates the bus busy, the command, the write control, and, then puts the valid data and the valid address on the bus;
7. Command Deactivated—all the bus master controlled signals are deactivated one bus cycle later;
8. Response Ready—the bus slave completes the write request and asserts the response line;
9. Bus Release—operation completes; the bus master releases the bus.

6.5.2 Stream Mode Read Operation

Figure 6:
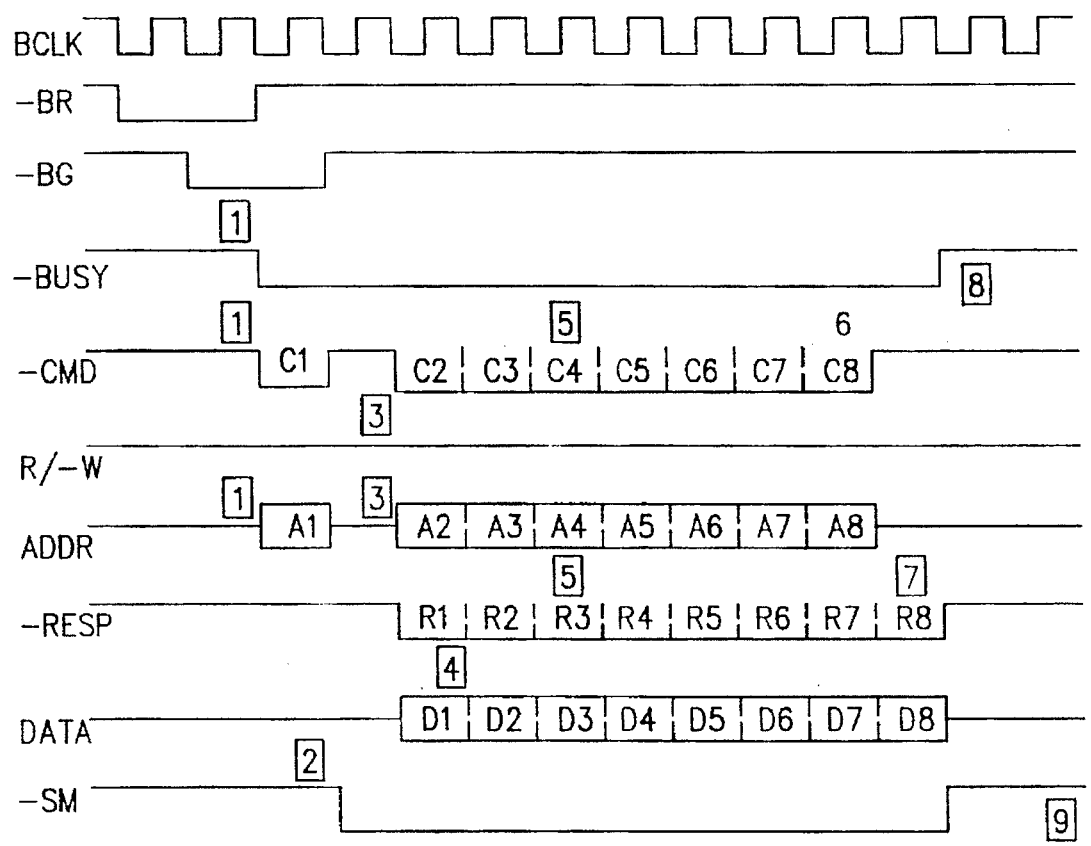
FIG. 6 illustrates signal interactions during stream mode read operations.

FIG. 6 shows the signal interaction during stream mode read operations:

1. Start Operation—after gaining bus ownership, the bus master asserts the command line and puts the valid address on the bus;
2. Stream Mode Ready—one cycle before it supplies the first response, the bus slave asserts the stream mode line to indicate it can support stream mode operation;
3. Another Operation Starts—the bus master starts another read operation by asserting the command line again;
4. Response Ready—the bus slave generates the response for the second read operation;
5. Stream Mode Operation Established—both the command and response lines stay low during stream mode operation; the data flows from the bus slave to the bus master at a rate of 32 bits per cycle;
6. Command Remove—the bus master completes all of its requests and removes the command line;
7. Response Remove—one cycle after the command line is removed, the bus slave removes the response;
8. Bus Release—at the end of the cycle that response is removed, the bus master releases the bus;
9. Stream Mode Remove—after command is removed, the bus slave removes the stream mode line;

6.5.3 Stream Mode Write Operation

Figure 7:
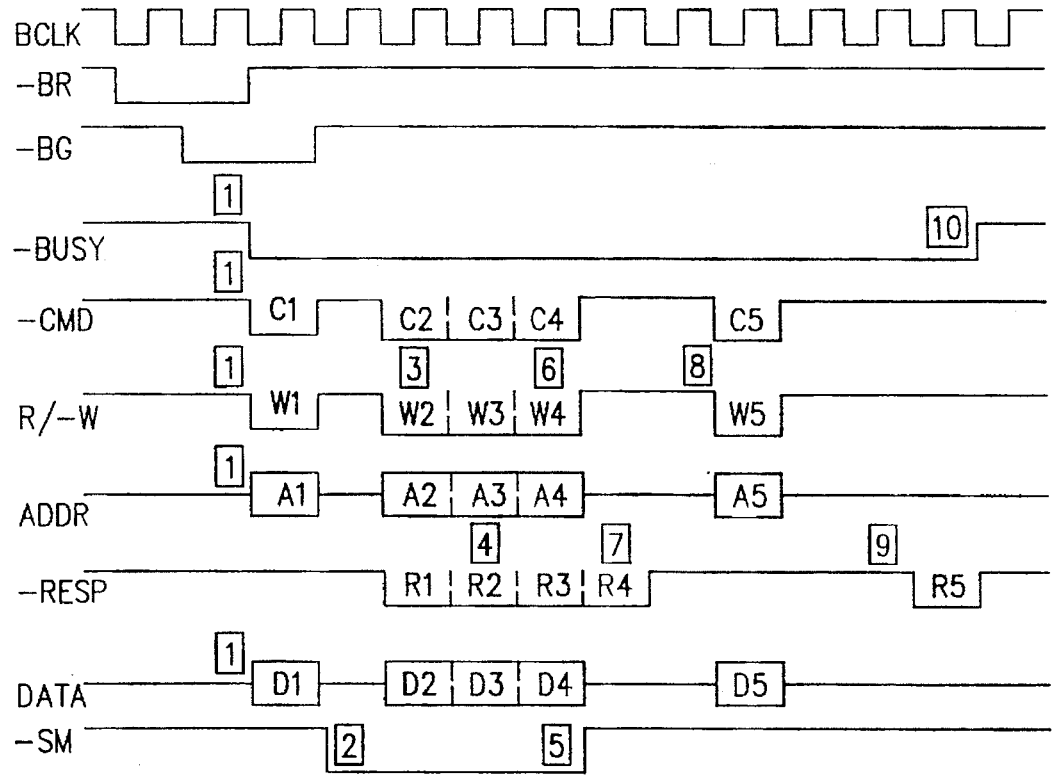
FIG. 7 shows signal interactions during stream mode write operations.

FIG. 7 shows the signal interaction during stream mode write operations:

1. Start Operation—after gaining bus ownership, the bus master starts its write operation by asserting the command line and putting both data and address on the bus;
2. Response Ready—one cycle before it supplies the first response, the bus slave asserts the "stream mode" line to indicate it can support stream mode operation;
3. Stream Mode Operation Start—the bus master starts another write operation by asserting the command line again;
4. Stream Mode Operation Established—the bus slave generates the response for the second write operation and establishes stream mode operation;
5. Stream Mode Operation Breakdown—if the bus slave decides not to support the stream mode operation any more, it can remove the stream mode line;
6. Command Remove—one cycle after the stream mode line is removed, the bus master deactivates the command line;
7. Response Remove—one cycle later, after the command line is removed, the bus slave removes the response line;

8. Another Operation Starts—the bus master asserts the command line again to start another bus operation after stream mode operation has broken down;
9. Response Ready—the bus slave generates the response for the last bus operation;
10. Bus Release—the bus master completes all of its operations; it releases the bus;

6.5.4 Stream Mode Pipelined Read Operation

Figure 8:
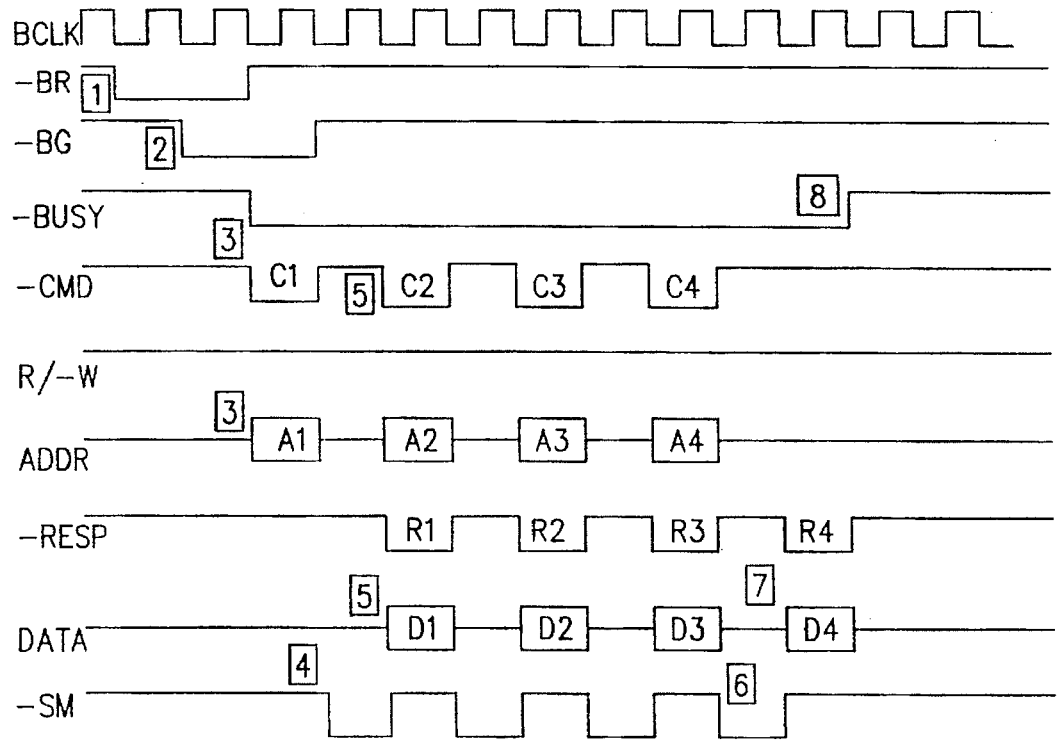
FIG. 8 illustrates signal interactions of stream mode pipelined read operations, and shows how a slow bus slave can use a stream mode signal to pipeline its read operations.

FIG. 8 shows the signal interaction of stream mode pipelined read operations: (it is to show how the slow bus slave can use the stream mode signal to pipeline its read operations)

1. Bus Request—the bus master requests bus ownership;
2. Bus Grant—one cycle later, GAM grants bus ownership;
3. Operation Start—one cycle later, after the bus grant, the bus master asserts the bus busy and starts the read operation by asserting the command line and putting the valid address on the bus;
4. Stream Mode Activated—even though the bus slave cannot generate the response fast enough, it can assert the stream mode line to request the next address;
5. Pipelined Operation Starts—one cycle after the stream mode line is asserted, the bus slave generates the response for the previous bus operation; at the same time, the bus master asserts the command line and starts another read operation;
6. Pipelined Operation Continues—the bus slave toggles the stream mode line and continues the pipelined operation;
7. Last Response Ready—the bus slave generates the response for the last bus operation;
8. Bus Release—the bus master completes all the read operations and releases the bus;

7.0 Packet Memory Interface—PMI

Each Generic High Bandwidth Adapter can have up to N adapter ports. These ports communicate with each other through queues in the Packet Memory and through interaction with the P. The communication of each port with the rest of the system is managed by the Packet Memory Interface (PMI) associated with that port. The Packet Memory is organized as a group of buffers, chained together into packets by the interactions of the GAM and the individual PMIs. A data stream, or packet, inbound from a communications front end, is stored in the PM by the PMI, using addresses in buffer obtained from the GAM. Outbound data is read from the PM by the PMI and presented to the communications front end in packet form.

The PMI is the translator between the specific communications front end (transmission line interface, LAN interface, switch fabric connection, or system bus attachment) and the rest of the GHBA system. The PMI presents a uniform interface to the GAB, providing a generic interface to the communications front end which can be customized to support a variety of interconnects. The generic portion of this interface is described in this report; specific implementations are described elsewhere.

7.1 Generic Functions of the PMI

The PMI exists to isolate the "front-end" of the communications port from the specific requirements of the Generic Adapter Bus (GAB). The functions that the PMI performs to support this isolation include:

Driving and receiving GAB signals, including the arbitration signals for gaining master status on the GAB.

Acting as the controller for packet assembly and multiplexing for up to 8 concurrent packets. While the number 8 may seem to both an arbitrary and a small number (violating the architectural principle which says that if a resource is provided, there should be either 0, 1, or an relatively infinite number of instances of the resource), for many applications, 8 is a sufficient number. Discussions of the uses of these 8 "sub-channels" can be found in the descriptions of specific implementations. The major advantage of providing only 8 sub-channels is that both the control information and data staging buffers can be contained on a single PMI chip.

Acting as a low latency staging buffer for the output queue set which this PMI serves. The PMI does not store a complete packet for each queue of the queue set, but rather stores enough of a packet from each queue to respond to the availability of transmission bandwidth without GAB arbitration latency. In one implementation, at most, 64 bytes are stored in the PMI for any packet at any time. This buffering provides the ability to utilize burst mode transfers on the GAB. The small size of the staging buffer ensures that the latency through this buffer will be small.

Enqueueing inbound packets by storing the packets in the PM and interacting with the GAM.

Maintaining the mapping information for translating packet type and source information into the queue IDs in the PM. This is a limited capability; on the order of 16 inbound queues may be in the mapped set. The specific mapping function is implemented in the communication front end.

Issuing GAM primitive requests.

Performing PM data buffer movements. The PMI acts as a GAB master, arbitrating for use of the GAB and generating addresses based on its previous communication with the GAM.

Generating GAB interrupts based on GAB errors, P asynchronous requests, and requests from the PMI's communication front end.

Monitoring the signal "GAM Busy" to mediate its own requests for use of the GAB. The PMI will not request the use of the GAB to talk with the GAM if the GAM is currently busy.

Monitoring the signals "Asynchronous Buffer Above" (ABABV) and "Free Buffer Below" (BELOW) to ensure that packets are transmitted inbound only when there is buffer space for them.

Monitoring the Queue Status Register Change lines. Each PMI maintains a shadow copy of the section of queue status register for the queues which this PMI is serving. The GAM, when it updates a queue status register, indicates this event with the signal QSRC. If the QSRC signal is asserted while the QA lines match the Queue-Id internal register of the PMI, then the PMI will initiate a read request of the queue status register to update its shadow copy.

Decoding and responding to other GAB masters' requests. In most cases these will be requests from the P. The PMI acts as a bus slave: responding to read or write requests to its internal registers, or providing a path to the control registers of its communications front end.

Performing arbitrary byte alignment adjustments both on inbound and outbound traffic.

Optionally performing arbitrary data filtering functions both on inbound and outbound traffic.

Optionally providing a path for the communications front end to communicate directly with the other ports, the PM, the GAM, and the P memory.

7.2 PMI Overview

Figures 9, 10:
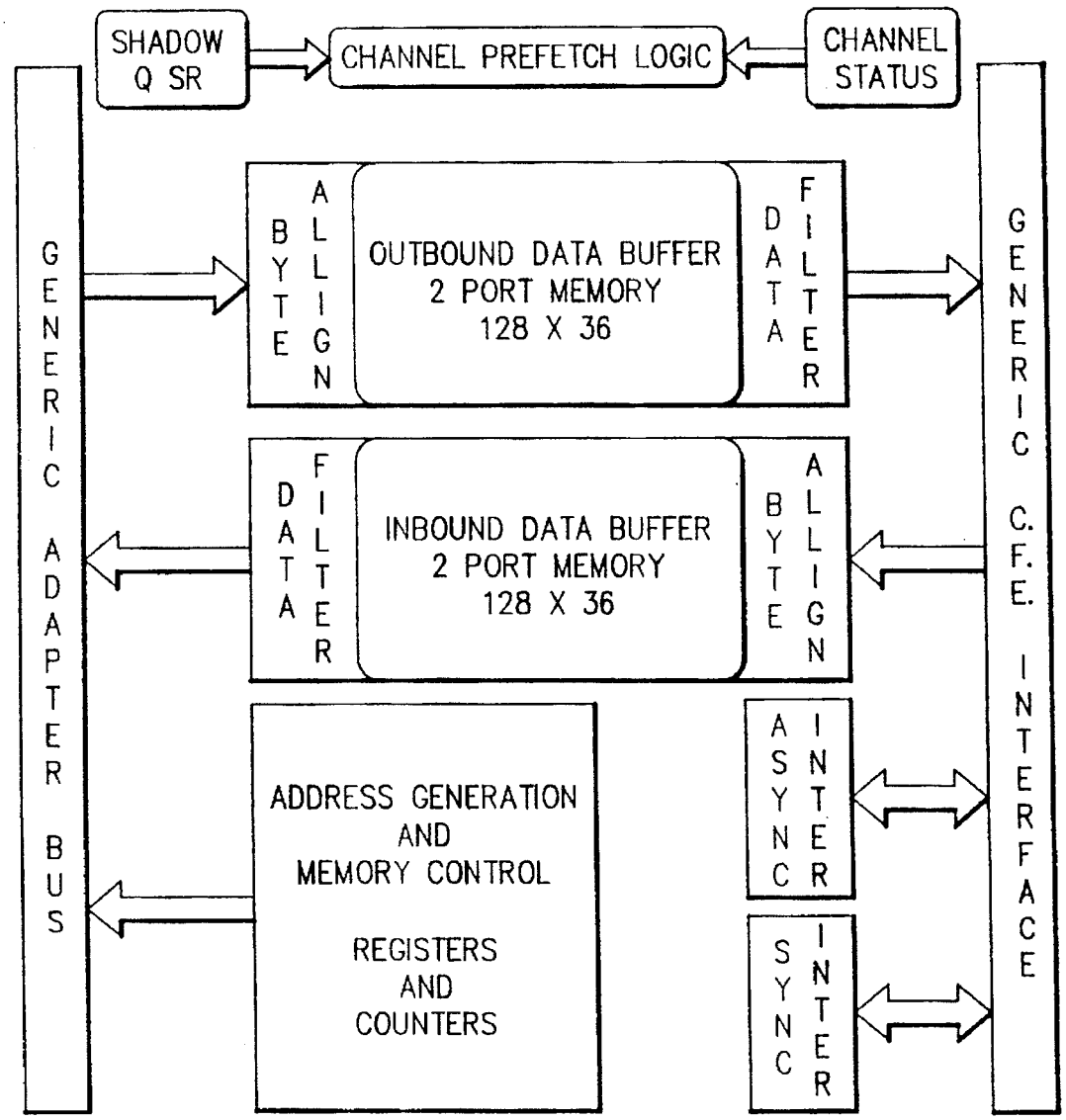
FIG. 9 is a schematic block diagram of a packet memory interface generic portion.
FIG. 10 illustrates the allocation of address space in the generic adapter bus.

A block diagram of the PMI is shown in FIG. 9. As can be seen from the figure, the PMI acts as the translator between the GAB and a generic communications front end interface. The discussion of this translation will be in 6 parts. After a brief overview, the outbound data path, the inbound data path, the synchronous register interface, the asynchronous register interface, and the interrupt mechanism will each be examined in detail.

Two dual-ported memories provide the elasticity and staging buffers for the packet data flowing into and out of the PM. Each of these data buffers has address generation and byte alignment logic at its input. The potential for specialized data filters exists on the output of either or both of the data buffers. The byte alignment logic on the input of the outbound data buffer allows the transfer of packets which are aligned on arbitrary bytes in the PM. The byte alignment logic on the input of the inbound data buffer allows for arbitrary alignment of bytes within words either from the network interface, or from a local bus interface. The data filters are optional parts of the architecture. As an example, a checksum module could be to be joined to the output of the inbound data buffer. This module could provide information to be used by the P for the production and checking of both TCP and ISO/TP class 4 checksums. Another example of a use for the data filter module would be in an FDDI support chip. The outbound data path could have an FDDI Frame Check Sequence generator in-line to allow full duplex FDDI operation with existing FDDI chips.

The registers and counters are used to generate addresses to the packet memory, construct GAM requests, and field P requests.

7.3 PMI Bus Activities

The PMI acts as both a bus master and a bus slave. When the P interacts with the PMI, the PMI will act as a slave to the P. These activities will take highest priority within the PMI bus subsystem.

The only bus subsystem priority level 2 task is for the PMI to write an event to the GAM. This will take place at the request of the device-specific portion of the PMI. A 32-bit word is written to the GAM, which will then queue this data for the P.

The activity of third highest priority is for the PMI to update its shadow queue status register. When the GAM updates a queue status bit, it signals the PMIs using the status update lines. If the update corresponds to the queues that this PMI is serving, the PMI will initiate a shadow queue status update cycle.

The PMI spends most of its time performing data transfer functions as the lowest priority of activity. The PMI round robins the scheduling of inbound and outbound transfers. The details of inbound and outbound data transfer interaction between the GAM and the PMI are described in chapters 4.0, Generic Adapter Manager (GAM) and 5.0, Queue Scheduling and Notification.

The table below summarizes the bus activities of the PMI. The activities are listed in priority order. The activities noted by the □ are not attempted while the GAM is busy.

Priority 1—Bus Slave Activities
  P Write Register
  P Read Register
  P Write Asynchronous Data
  P Start Asynchronous Data Request
  P Read Asynchronous Data
  P Write Synchronous
  P Read Synchronous
  □ Priority 2—PMI Write Event to GAM
  □ Priority 3—PMI Update Shadow Register
Priority 4—Inbound/Outbound Packet Data Transfer (Round Robin)
  Inbound
    □ Request Reception
    □ Request Buffer
    Write to Packet Data to PM
    Write Filter Data to PM
    □ Enqueue Packet
    □ Flush Packet
  Outbound
    □ Request Transmission
    □ Next Buffer
    Read from PM
    □ End Transmission

7.3.1 PMI—GAB Address Responses

The address space of the GAB is separated into four major sections: Processor memory, Packet Memory addressing, GAM addressing, and PMI addressing. The PMI addressing is, in turn, separated into ranges according to the PMI-ID. Using its PMI-ID register, each PMI will react to a different range of addresses. The address space of each PMI is segmented into four ranges, one each for the Communications Front End Synchronous and Asynchronous interfaces and one each for the Generic and Device-Specific PMI Internal registers. FIG. 10 shows this split.

7.3.2 PMI—GAB interface Signals

The PMI connection to the GAB (Generic Adapter Bus) is a parallel connection consisting of the signals listed below. Some general comments about the list:

The format of each entry in the list is:

1 Name—(I) This entry is an example of a single input signal.

[Number of Pins in this signal group][Signal Name]—( [Input/Output]) Explanation of signal.

A signal with a hyphen as the first character in its name is assumed to be asserted low.

All pins labeled (I) are inputs to the PMI.

All pins labeled (O) are outputs from the PMI.

All pins labeled (I/O) can be either inputs or outputs, depending on the bus cycle. The dependencies are whether the PMI is acting as bus master or slave during the cycle, and whether the cycle is a read cycle or a write cycle. The description will explain when the signal is an input, when it is an output, and when the PMI has tristated this pin.

All pins labeled (O/T) are either outputs, or high impedance. These are the pins which are driven, but not observed.

The PINS of the PMI/GAB interface are:

1 BCLK—(I) The GAB is a synchronous bus, with all of its transitions taking place on the falling edge of BCLK. Signals are assumed to be stable while BCLK is high.

1 -BR—(0) The Port-PMI requests the use of the PM bus by driving its Bus Request line low. There is a separate -BR line for each potential bus master.

1 -BG—(I) The bus arbitration logic responds to all of the bus requests each BCLK cycle. There is a separate bus grant (-BG) signal to correspond with each -BR signal. The -BG input to the Port-PMI is used, in combination with the next signal (-BUSY), by the Port-PMI to decide whether it may become a bus master. When both -BG (of this Port-PMI) is asserted, and -BUSY is not asserted, this Port-PMI has access to the bus.

1 -BUSY—(I/O) The Port-PMI drives this signal low when it has gained access to the bus. At the end of the PMI's use of the bus, it will drive the –BUSY line high for one cycle. At the end of that cycle, the Port-PMI will tristate its –BUSY pin.

1 –CMD—(I/O) This signal is driven by the PMI when the Port-PMI gains bus mastership and wishes to start a bus request to a slave. It is monitored to determine the start of potential slave cycles when this PMI is not a bus master.

1 R/–W—(I/O) Driven when master. When driven high, the cycle is a read cycle; when driven low, the cycle is a write cycle.

1 –RESP—(I/O) When the Port-PMI detects an address match on a bus command, it will respond to the request. See the section on bus protocols for the timing of this signal. This signal is an output in slave mode, and an input while the Port-PMI has bus mastership. If the PMI detects a parity error or a bus error cycle, it will not drive this signal.

1 –SM—(I/O) This signal is driven high (not asserted) when the Port-PMI is a bus slave. The PMI does not offer to go into slave stream mode. This signal is, however, monitored while the Port-PMI is a bus master, as the PM will drive this signal during packet data transfers.

3 SLOT-ID[0:2](I) These inputs are hardwired pins. Used for Port-PMI configuration, these pins supply the default contents of the Command-Id and Queue-Id registers. The 3 bits of SLOT-ID are loaded into these registers on POR and software reset.

24 ADDR[02:25]—(I/O) These pins are driven as outputs by the Port-PMI when it has bus mastership. These pins are valid only during the bus cycles in which –CMD is asserted. The Port-PMI monitors these pins when it is not the bus master. If a bus command has an address of (ADDR[25]=1 && ADDR[24]=1 && ADDR[23]=0 && ADDR[20:22]= PMI-ID[0:2]) then the Port-PMI will become a slave for this bus cycle.

3 PA[0:2]—(O/T) The address parity lines are driven as outputs by the Port-PMI when it is the bus master. Odd parity is used on these lines. PA[0] protects ADDR[02:09]; PA[1] protects ADDR[10:16]; PA[2] protects ADDR[17:25].

4 BE[0:3]—(I/O) The byte enable signals are driven by the Port-PMI when is is the bus master. During memory read cycles initiated by the PMI, all 4 signals will be driven, as all transfers will be 32-bit reads. There is an option for write cycles to memory to be partial writes, but the buffering in the Port-PMI eliminates the need for partial word writes. For this reason, during all PMI master write cycles all four byte enable lines are driven.

1 BEP—(O/T) The byte enable parity line is driven with the odd parity of BE[0:3] when the Port-PMI is bus master.

1 BERR—(I) The bus error line is driven by GAM Bus error monitor. If –BERR is asserted during any bus cycle, the current bus cycle, if any, is aborted, and the BERROR bit is set in the internal STATUS register. This bit can be cleared by writing to the STATUS register. Whenever the BERROR bit is asserted, no data movement between the PMI and the communications front end will take place, and any transfer attempted by the communications front end will be aborted or flushed. The BABORT bit is set in the internal STATUS register when the Port-PMI aborts a bus transaction due to bus error.

32 DATA[00:31]—(I/O) The GAB data pins are driven when the Port-PMI is the bus master and the cycle is a write cycle. The pins are valid only during the clock cycle that –CMD is asserted. When the Port-PMI as acting as the responding bus slave to a read cycle initiated by another bus master, the it will drive the data pins on the GAB during the clock cycle that it drives –RESPONSE.

4 PD[0:3]—(O/T) The GAB data parity pins are driven by the Port-PMI whenever the GAB Data pins are driven. Data parity is odd. PD[0] protects DATA[00:07]; PD[1] protects DATA[08:15]; PD[2] protects DATA[16:23]; PD[3] protects DATA[24:31].

1 -GBUSY—(I) The GAM Busy (-GBUSY) signal is used by the PMI to decide whether to request the GAB, and what type of cycles to initiate. The Port-PMI will not attempt to start a new GAM interaction bus cycle while –GAM_BUSY is asserted.

1 QSRC—(I) The Queue Status Register Change pin is watched by a portion of the Port-PMI. This signal is driven by the GAM when the status of a queue changes.

3 QA[0:2]—(I) The Queue Address lines are also driven by the GAM when it updates a queue status bit. The Port-PMI compares the QA bits with its internal Queue-Id register. If these two, 3-bit values match when QSRC is asserted, the Port-PMI will initiate an Update_Shadow_Queue_Status_Register cycle.

1 -RV—(O) When another bus master initiates a read from the asynchronous interface of an Port's PMI, the address of the read is stored in the Asynchronous Interface Address Buffer of the Port-PMI and the Port front end is notified of the asynchronous request. When the front end has written the corresponding data to answer the request into the Asynchronous Interface Data Buffer, the Port-PMI will assert Response Valid (–RV). This indication will be cleared when another bus master reads the contents of the Asynchronous interface Data Buffer. More generally, –RV is set when the Asynchronous interface Data Buffer is written into, and is cleared when the Asynchronous 5 Interface Data Buffer is read from.

1 -INT—(O) The interrupt request signal of and Port-PMI is driven from the OR of the bits in the STATUS register ANDed with the bits in the INTERRUPT_MASK register.

1 ABABV—(I) This input is driven by the GAM, and indicates (when asserted) that asynchronous packets are occupying more space in the PM than has been allocated for them. When this condition is true, the Port-PMI will either flush or stop storing the packets that would have been stored in queues that have their Asynchronous_Queue_Mask bit set, depending on the value of the Full_Flush Status Bit.

1 BELOW—(I) This input is driven by the GAM, and indicates (when asserted) that synchronous packets are occupying more space in the PM than has been allocated for them. When this condition is true, the Port-PMI will either flush or stop storing the packets that would have been stored in queues that have their Synchronous_Queue_Mask bit set depending on the value of the Full_Flush Status Bit.

1 RESET—(I) This pin will cause the Port-PMI to abort any transaction that it is running, and to completely reset itself to Power On condition. All internal state machines will go to their reset states, all registers will be loaded with their default values. The Interrupt mask registers will be cleared and the RESET bit in the STATUS register will be set.

7.4 PMI Communications Front End Interface

Although specific implementations of the PMI will differ, there is a generic form that the interface between the PMI buffering and the communications front end will take. This interface, shown in FIG. 11, includes signals for:

Moving packet data from the communications front end into the PM.

Moving packet data from the PM out through the communications front end.

Reading and writing Communications Front End control data using both synchronous and asynchronous timing schemes.

Passing interrupts from the Communications Front End to the P.

Writing Asynchronous Event data to the GAM.

These portions of the generic interface are made up of the signals and registers described below. These descriptions indicate the full range of possible interface functions.

If a particular communications front end does not require the full capabilities of the PMI, the full set of signals and functions need not be provided.

Inbound Packet Data—Packet Data may arrive on any of 8 separate control channels through the PMI. The control channel will handle the routing of the packet into the PM. After a packet has been completely received, the PMI will enqueue the packet into a queue in the PM. The signals below are used to manage the transfer of packet data from the communications front end to the PMI:

32 IDATA[00:3]—(I) The Inbound data may be protected by parity; this would add an additional 4 signals. The inbound data path is logically 4 bytes wide, but may physically be one, two, or four bytes wide. The ordering of these bytes within the word may be changed under hardware control (see the description of the Byte Order Registers).

4 IDATAP[0:3]—(I) The inbound data parity will be stored and passed on to the PM bus with the corresponding bytes of data.

ID_READY—(O) The inbound Data Ready signal is used to tell the communications front end about the availability of buffering space. The GAM signals ABABV and BELOW are monitored to produce this signal. This signal must be asserted for date to be transferred. The ready signal will be asserted correctly for the corresponding channel one clock cycle after any change of ID_CID.

1 ID_CLOCK—(I) The communications front end controller provides the inbound data clock. This clock is used by the PMI to latch data into its internal buffer.

3 ID_CID[0:2]—(I) The inbound Data Channel Identifier is used to communicate which logical channel should be routing the current data burst. To multiplex packets, each concurrent packet must be under the control of a different logical channel.

1 ID_QSELV—(I) For a description of the Inbound Data Queue Selector Valid Signal, see below.

8 ID_QSEL[0:7]—(I) The Inbound Data Queue selectors are read during the cycle that the ID_QSELV signal is asserted. The Queue selectors will be used to index the Inbound Queue map to determine which queue the current packet on the current channel should be stored in when complete. Although there are 256 Queues in the GAM and there are 256 combinations of possible ID_QSEL signals, there need not be a one-to-one mapping. More often, many combinations of ID_QID signals will map to the same queue. The P will set up the mapping register at adapter 1PL. The Inbound Queue map will be zeroed during Power On Reset. Some implementations of the architecture may use fewer that 8 selector lines.

1 ID_LAST—(I)The inbound Data Last signal indicates that the word currently being transferred is the last word of a packet.

4 ID_BV[0:3]—(I) The Inbound Data Byte Valid signals can be used in the cases that a communications front end might provide packets which are not word aligned. The PMI will repack the words to make use of contiguous locations in the PM.

1 ID_FLUSH—(I) If the communications front end decides that the current packet should not be stored, it may assert the ID_FLUSH signal. This will stop the storage of the current packet, and if any PM memory was used, the PMI will release that memory using the Packet flush command of the GAM.

1 ID_ABORT—(O) If the PMI detects any error in the receipt of a packet & colon a GAB error, a lack of PM buffers, or a parity error; it will assert the ID_ABORT signal, and will flush the packet. The communications front end should assert ID_LAST on that inbound channel, and then resume transmission on that channel with the next new packet.

Figure 12:
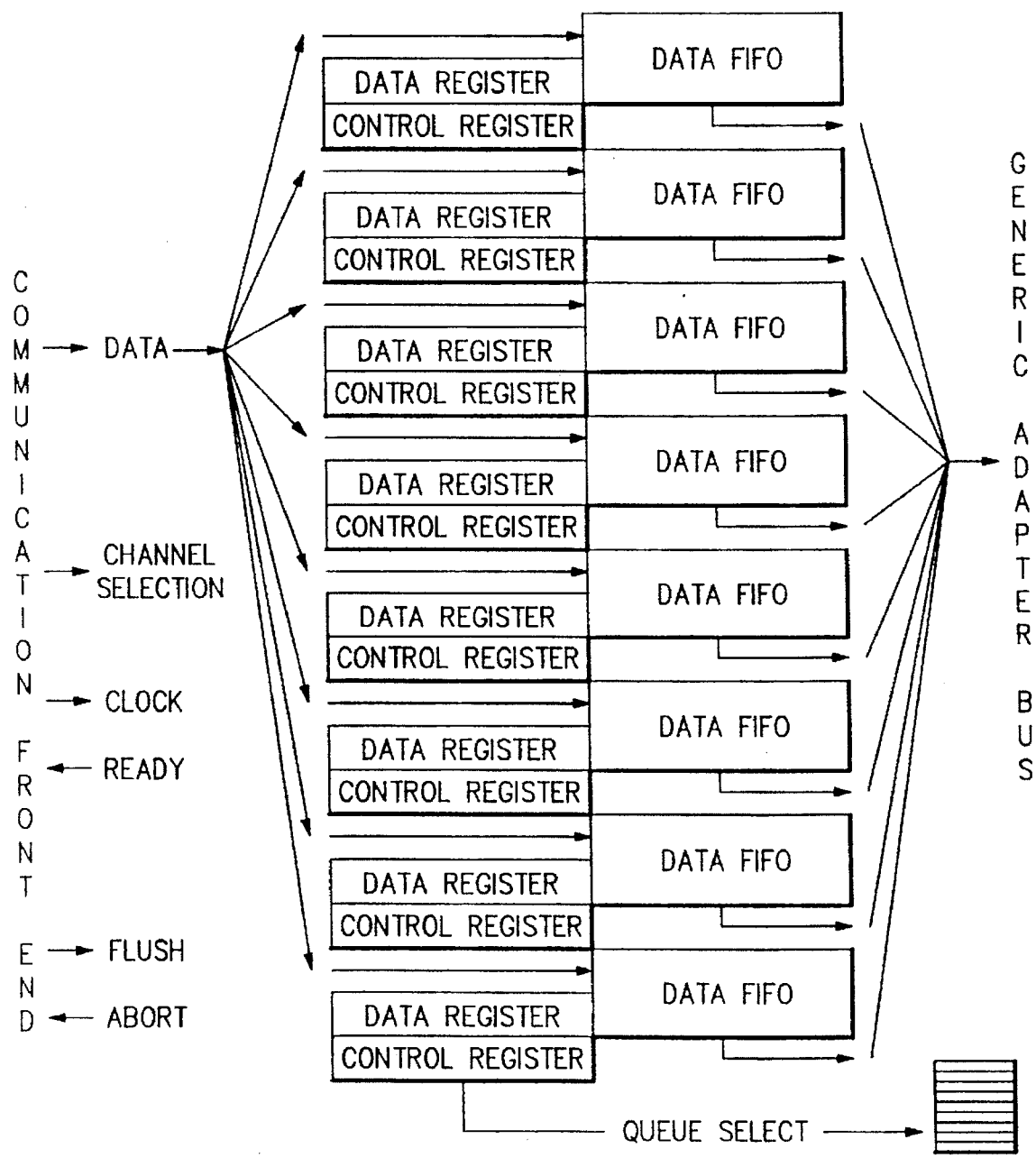
FIG. 12 shows a data path from communications front end through packet memory interface, and shows schematically the relationship between inbound channels and queues they feed.

FIG. 12 shows schematically the relationships between the inbound channels and the queues that they feed. A packet is not queued in the PM until the PMI send an Enqueue_Packet command to the GAM with the Queue identifier for that packet. Each channel will be controlling the data flow of a different packet.

Outbound Packet Data. Just as the inbound data path has control channels to handle individual packets, and queues to hold groups of packets, the outbound data path also uses queues and channels. Each PMI will serve a group of queues, removing packets from them, and using its internal control channels to transfer the data from those packets to the communications front end.

The PMI will associate the queues with the channels, and prefetch data into the control channels so that the communications front end will have packet data available with minimum latency. In its simplest form, the association of queues to channels will be a one-to-one mapping. This will allow the communications front end to have full control over the ordering of packets from the queues. A more complex form of mapping is also potentially available within the architecture.

The Queue status register in the PMI will be updated when the queue status of one of the queues that this PMI is serving has changed in GAM. The GAM uses the QSRC signal to indicate this change, and the PMI will then update its shadow copy. The updated set is potentially as large as the entire queue set (256); the actual implementations will probably limit the number to a quantized range of 32 queues to enable the queue status for the range of queues to be updated with a single bus read from the GAM.

Given a queue status register larger than the number of outbound control channels, a mapping is necessary to assign queues to channels. Specific implementations of PMIs may use whatever mapping they desire; the generic architecture allows for an arbitrary mapping with each control channel serving its multiple queues in either a round-robin fashion or a modified priority scheme. The modified priority scheme is one in which the first packet to be queued in a queue which a channel is serving will be prefetched into that channel. When the channel is free, it will take its next packet from the highest priority queue. This is priority without preemption.

Figures 11, 13:
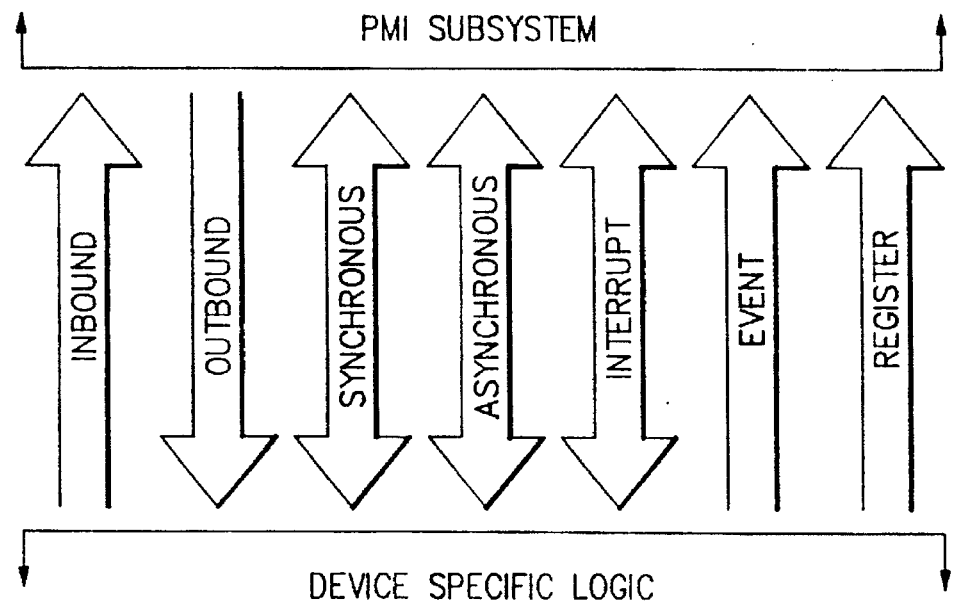
FIG. 11 illustrates a generic form of a packet memory communications front end interface.
FIG. 13 illustrates an example of packet memory interface mapping of queues to outbound control channels.

An example of the mapping of Queues to outbound control channels is shown in FIG. 13. Note that in this example, queue (base+) 0 is served by channel 0, queue (base+) 1 is served by channels 1 and 2, queues 2 and 4 through N−1 are not served (may be served by other PMI's), queue (base+) 3 is served by channels 3 and 4, and queue N is served by channels 5, 6, and 7.

Using a one-to-one map from queues to channels, the communications front end can implement priority with preemption if it desires.

The signals below are used to actually transfer the outbound packet data:

8 OCSR[0:7]—(O) The Outbound Channel Status register is the register which actually has relevant information for the communications front end. The channel status bit is set for a channel when the FIFO staging buffer is at least half full for that queue or the last byte has been received but not transmitted from a channel. This status information is used by the communications front end rather that the shadow queue status register because it reflects those queues which can actually supply data without interruption to the front end.

32 ODATA[00:31]—(O) This is the outbound data bus. While it is logically 32 bits wide, and a new 32-bit word can be supplied every clock cycle, the implemented bus may contain parity, and the implemented interface may have the bytes multiplexed in sequence on the same 8 (9) or 16 (18) signal lines. The data is clocked out of this interface by the OD_CLOCK, and is valid whenever the OD_READY line is asserted.

4 ODATAP[0:3]—(O) The outbound data is protected by parity. This parity is checked at the PM bus as the data is inserted into the staging FIFO, but is not checked as the data is output from the PMI.

1- OD_CLOCK—(I) As described above, the OD_CLOCK moves data from the generic PMI to the communications front end control logic. New data, if available, will be moved into the OD_DATA register and the OD_READY line will be asserted during the next clock cycle.

3 OD_CR[0:2]—(I) The Outbound Data Channel Request indicates the channel from which the communications front end logic would like to receive the next data burst.

1 OD__READY—(O) As described above, the OD_READY signal is asserted when there is data valid at the output of the OD_DATA register. This signal will be asserted one clock cycle after any change to the OD_CR signals.

1 OD LAST—(O) Output Data Last is asserted during the transfer of the last byte of packet data.

4 OD_BV[0:3]—(O) Output Data Bytes Valid is useful on a 32-bit or 16-bit interface that might have packets that are not 32-bit padded. The signals indicate which of the current output data bytes are valid.

1 OD_FLUSH—(O) If a GAB error occurs during a packet transfer, the PMI will assert the OD_FLUSH signal, and cease transmission of the current packet. The PMI will not transmit any further packets until it has been reset by the P.

1 OD_ABORT—(I) If the Communications Front End finds that it cannot transmit a packet, it may assert the Output Abort signal. The PMI will stop transmitting a packet, set the Output Abort Status bit and lock this channel. The PMI will not dequeue the packet; this must be done by the P.

Synchronous Register Interface. The synchronous register interface is used when the communications front end can guarantee that the latency of a response will be less than the bus cycle upper limit. There are additional design reasons that the asynchronous interface may be used even when the response will be close to the upper limit, i.e. when there will be little data transferred, or when it is known that the latency is indeterminate. The synchronous interface provides a very simple software interface to communications front end registers. The P simply reads or writes the register.

16 SYNC_ADDR[00:15]—(O) The Synchronous address is made up of the GAB address bus bits [02:17]. These bits are available to the communications front end logic.

32 SYNC_ODATA[00:31]—(O) The Synchronous output data is made up of the GAB data bus bits [00:3]. These bits are available to the communications front end logic.

32 SYNC_IDATA[00:31]—(I) The Synchronous input data is returned from the communications front end logic. The PMI will multiplex, latch, and drive the data onto the GAB DATA lines [00:31]. Some implementations may drive fewer than 32 of data lines; in these implementations, the PMI will pad the rest of the data lines with 0's.

1 SYNC_REQ—(O) The PMI will generate a synchronous request when it recognizes a bus request for its synchronous interface.

1 SYNC_RESP—(I) The communications front end will generate the signal Synchronous Response when the synchronous data is valid. The synchronous data must be valid during the entire synchronous response clock cycle. During a synchronous read cycle, the synchronous response signal indicates that the synchronous data is no longer needed.

1 SYNC_RW—(O) The synchronous read/write signal is a shadow of the GAB R/-W signal.

Asynchronous Register Interface. As explained above, the asynchronous interface is used when the response latency is unknown. The internal Response Valid register is used to communicate with the P support unit. When an asynchronous request is made by the P, the response valid register is reset, and the communications front end logic is notified that there is an asynchronous request pending. Asynchronous data will be available to the P in the Asynchronous_Data Register. The signals used for asynchronous transfers are:

16 ASYNC_ADDR[00:15]—(O) The Asynchronous address is latched from the GAB address bus bits [02:17]. These bits are available to the communications front end logic until the next GAB asynchronous request destined for this PMI.

32 ASYNC_ODATA[00:31]—(O) The Asynchronous output data latch is made up of the GAB data bus bits [00:31]. On an asynchronous write, these bits are available to the communications front end logic until the next GAB asynchronous request destined for this PMI.

1 ASYNC_REQ—(O) The PMI will generate an asynchronous request when it recognizes a bus request for its asynchronous interface. This signal will be latched until the communications front end indicates that is has read the request by asserting ASYNC_RESP.

1 ASYNC_RW—(O) The asynchronous read/write signal is a latched shadow of the GAB R/-W signal from the cycle which started the asynchronous request.

32 ASYNC_IDATA[00:31]—(i) The Asynchronous input data is returned from the communications front end logic. The PMI will latch this data, and drive the data onto the GAB DATA lines [00:31]. during the next GAB asynchronous read cycle destined for this PMI.

1 ASYNC_RESP—(I) The communications front end will generate the signal "Asynchronous Response" when the Asynchronous input data is valid. The asynchronous data must be valid during the entire asynchronous response clock cycle. The assertion of this signal by the Communications Front End will cause the PMI to set the response valid signal. The PMI will reset the "Response Valid" signal during the next GAB asynchronous read cycle destined for this PMI.

Event Interface. The Communications Front End may have occasion to asynchronously generate event data which must then be transferred to the GAM. The Communications Front End interface for the event data is fairly simple. A 32-bit latch holds pending event data. A single bit latch indicates whether the event latch is empty or full. A particular communications front end may provide a separate interface for event transmission, or the event interface may be part of the register interface. The signals used in the event interface are:

29 EVENT_DATA[00:28]—(I) The Event data latch holds the event data until the PMI can write the data to the GAM. The 3 high order bits of the event data written to the GAM will be taken from the PMI-ID register. This will allow the processor of the event queue to distinguish the sender of the event data.

1 -WR_EVENT—(I) When the Write Event signal is asserted by the communications front end, event data is strobed into the event data register and the event pending register is set.

1 EVENT_PENDING—(O) The Event Pending Register is set when data is strobed into the Event Data Register, and is reset when the PMI is able to write the data to the GAM. The Communications Front End may use this output to gate its use of the event register.

Interrupt Interface. Status bits that are not masked in the status mask register will drive the interrupt line out of the PMI. The communications front end can drive status bits directly.

1 FE_INT—(O) As stated above, the Front End Interrupt signal will be asserted whenever an asserted bit in the status register corresponds to an asserted bit in the FRONT_END_INTERRUPT_MASK.

Register FRONT_END_INTERRUPT_MASK—(I) The front end interrupt mask can be set by the P or by the front end logic. The communications front end logic may set this register using the register interface described below.

1 CFE_INT—(I) The Communications Front End may produce a single signal which is reflected in the PMI interrupt status register, and may be used to cause interrupts to either the Communications Front End or the P depending on the settings of the interrupt mask registers. Section 7.5.1, PMI Interrupt Status Register describes this mechanism.

16 CFE_STATUS[00:15]—(I) The Communications Front End may also produce a group of status signals which will be reflected in the PMI interrupt status register, and may be used to cause interrupts to either the Communications Front End or the P depending on the settings of the interrupt mask registers. Section 7.5.1, PMI Interrupt Status Register describes this mechanism.

Register Interface. The Communications Front End may read or write any of the registers of the PMI which are accessible to the P. Access to the registers may be interlocked by using LOCK signal from the P and an atomic signal from the communications front end. A list of the generic registers and their functions is in the next major section.

9 REG_ADDR[0:8]—(I) The Register address lines are used to select the register to be read or written.

1 REG_RW—(I) Asserted high indicates a read request; low, a write request.

1 REG_REQ—(I) The communications front end asserts this signal to begin a register operation.

1 REG_ACK—(O) The PMI asserts this signal to indicate either the data has been read into a register, or that data is available for reading from a register.

32 REG._IDATA[00:31]—(I) The register input data will be read from these lines. Only the number of bits that are needed will be read.

32 REG_ODATA[00:31]—(O) The register data can be read from these lines. Only the number of bits that are in the register will be valid.

1 REG_LOCK—(I) This signal indicates that a read-modify-write cycle is taking place on the Communications Front End. This signal should be driven by the Communications Front End processor when it is attempting to atomically modify values in the internal registers of the PMI. A similar signal is produced by the P (GAB signal LOCK). The PMI lock state machine provides a guarantee that read-modify-write register cycles will be atomic. This allows the use of PMI registers for reliable communication between the communications front end and the P of the Generic High Bandwidth Adapter system.

7.5 PMI Internal Registers

The generic PMI will have a given set of register which will be described here. A device-specific implementation of the PMI may have additional registers, and some of the registers described here may not be applicable.

7.5.1 PMI Interrupt Status Register

Use: The interrupt register is used to notify either the Communications Front End or the P that an event has occurred, or that a condition exists that either the Communications Front End or the P should be aware of. This register is used in connection with the GAB Interrupt Mask Register and the CFE Interrupt Mask Register to actually generate the interrupt signals.

Length: 32 bits

Type: Read/Partial Write (See individual bit descriptions.)

Description:

| | |
|---|---|
| Bit 0 | RESPONSE_VALID Indicates that the Asynchronous Data Register contains valid data. Reading the Asynchronous Data Register will clear the bit. |
| Bit 1 | FRONT_END_INTERRUPT Indicates that the Communications Front End is generating an interrupt. The Communications Front End must clear this bit. |
| Bit 2 | BERROR Indicates that this PMI has observed a bus error without being reset. The side effect of this is that the PMI will not transfer any packet data. This bit must be cleared directly. |
| Bit 3 | BABORT Indicates that this PMI has had to abort a bus transaction due to parity or timing errors. This bit must be cleared directly. |
| Bit 4 | RESET When this bit is set, the PMI will perform a Power On Reset, and then clear this bit. |
| Bit 5 | OD_ABORT Indicates that the PMI has received an Output Data Abort without being reset. This bit must be cleared directly. |
| Bit 6 | ID_ABORT Indicates that this PMI has had to generate an input data abort to the Communications Front End because of lack of buffer space. This bit must be cleared directly. |
| Bit 7 | OD_FLUSH Indicates that this PMI has had to generate an output data flush to the Communications Front End because of a bus error condition. This bit must be cleared directly. |
| Bit 8 | ID_FLUSH Indicates that this PMI has received an input data flush from the Communications Front End. This bit must be cleared directly. |
| Bit 9 | Event_Register_Full Indicates that the event register has had something written to it. It does not mean that there is anything currently valid in the register. It can be used to determine whether the Communications Front End has generated any events since the last time that this bit was reset. This bit must be cleared directly. |
| Bit 10 | GAB_INT When set, is capable of generating an interrupt to the GAB P. The GAB Interrupt mask must enable this bit for this bit to generate an interrupt. |
| Bit 11 | CFE_INT When set, is capable of generating an interrupt to the Communications Front End. The CFE Interrupt mask must enable this bit for this bit to generate an interrupt. |
| Bits 12:15 | Reserved Should be ignored when read, and restored to its previous value when the Interrupt Status Register is written. Using the Bit set and Bit clear operations of the P will allow this to occur. |
| Bits 16:31 | CFE_Specific Specified by the specific Communications Front End, these bits are status bits wich may be used to produce interrupts. |

These status bits are described on previous paragraph.

Power-On-Reset Value: Communications Front End dependent, should be: 'hex 0000 0000'

7.5.2 GAB Interrupt Mask
Use: Limit the interrupts generated to the P.
Length: 32 Bits.
Type: Read/Write
Description: Used in conjunction with the Interrupt Status Register, this registers determines which interrupt status bits will actually interrupt the P. Both the bit in the mask register and the bit in the status register must be set for an interrupt to be generated to the P.
Power-On-Reset Value: 'hex 0000 0000'

7.5.3 CFE_Interrupt_Mask
Use: Limit the interrupts generated to the Communications Front End.
Length: 32 bits.
Type: Read/Write
Description: Used in conjunction with the Interrupt Status Register, this registers determines which interrupt status bits will actually interrupt the Communications Front End. Both the bit in the mask register and the bit in the status register must be set for an interrupt to be generated to the CFE.
Power-On-Reset Value: 'hex 0000 0000'

7.5.4 Queue-Id
Use: Determine the base address of the Shadow Queue Status Register in this PMI.
Length: 3 bits.
Type: Read/Write
Description: The setting of this register is used to watch the QA[0:2]. signals generated by the GAM. When the queue status register change signal is asserted, and there is a match of this register and the QA signals, this PMI will initiate a shadow queue status register update cycle, using the Queue-Id register to generate the request address.
Power-On-Reset Value: SLOT_ID[0:2]

7.5.5 PMI-ID
Use: Used to determine what bus addresses to act as a slave for.
Length: 3 bits.
Type: Read/Write
Description: Using this register, PMI's can be substituted one for another. This register will be used to generate the requester's address in GAM transactions.
Power-On-Reset Value: SLOT_ID[0:2]

7.5.6 Queue_MAP_Inbound[0:255]
Use: Map between Communications Front End functional queue addressing and GAB physical queue addresses.
Length: 256 by 10 bits
Type: Read/Write
Description: Each entry is 10 bits long. Bits [0:7]are the queue address, bit 8 set indicates that this is an Asynchronous queue, bit 9 set indicates that this is an Synchronous queue.
Power-On-Reset Value: 'hex 000' for whole table.

7.5.7 Bus_Burst_Length
Use: Limit the number of words in a bus burst.
Length: 8 bits
Type: Read/Write
Description: This is used as an initial value for a down counter that is set at the beginning of each bus master cycle. When each word is transferred, the counter is decremented. When this counter reaches zero, the cycle will end.
Power-On-Reset Value: 8

7.5.8 Bus_Burst_Time
Use: This will limit the number of bus cycles that this PMI will attempt to hold bus mastership.
Length: 8 bits
Type: Read/Write
Description: This is used as an initial value for a down counter that is set at the beginning of each bus master cycle. Each bus clock cycle the counter is decremented. When this counter reaches zero, the cycle will end.
Power-On-Reset Value: 16

7.5.9 Shadow_Queue_Status_Register
Use: Informs the PMI which queues have packets in them.
length: 32 bits.
Type: Read/Write
Description: This register is loaded automatically by the PMI from data stored in the GAM.
Power-On-Reset Value: 'hex 0000 0000'

7.5.10 Staged_Channel_Status_Register
Use: This register is used by the Communications Front End to determine which channel has data ready to be transferred outbound.
Length: 8 bits.
Type: Read/Write
Description: Each bit indicates the whether the corresponding channel is at least half full.
Power-On-Reset Value: 'hex 00'

7.5.11 Asynchronous Interface Address Buffer
Use: Register which holds the Asynchronous Request Address.
Length: 16 bits.
Type: Read/Write
Description:
Power-On-Reset Value: 'hex 0000'

7.5.12 Asynchronous Interface Data Buffer
Use: Bidirectional Data Buffer, part of the asynchronous interface.
Length: 32 bits.
Type: Read/Write
Description:
Power-On-Reset Value: 'hex 0000 0000'

7.5.13 Inbound Byte Order
Use: Used to determine the ordering of bytes in a 32 bit word as they travel inbound to the PM.
Length: 16 bits.
Type: Read/Write
Description: Each 4 bits determines the source of the corresponding byte. The power-on-reset value is no reordering.
Power-On-Reset Value: 'hex 8421'

7.5.14 Outbound Byte Order
Use: Used to determine the ordering of bytes in a 32-bit word as they travel outbound to the Communications Front End.
Length: 16 bits.
Type: Read/Write
Description: Each 4 bits determines the source of the corresponding byte. The power-on-reset value is no reordering.
Power-On-Reset Value: 'hex 8421'

7.5.15 Inbound Memory Base Address
Use: Used to bypass the GAM for the generation of addresses by the PMI for packet storage or access to the P local store.
Length: 24 bits.
Type: Read/Write
Description: If there is a non-zero count ill the Inbound Memory Transfer Count register this register will be used to generate the storage addresses for data which is received on channel 0. The value of the register will be incremented after each use.

Power-On-Reset Value: 'hex 00 0000'

7.5.16 Inbound Memory Transfer Count

Use: Used to bypass the GAM for the generation of addresses by the PMI for packet storage or access to the P local store.

Length: 16 bits.

Type: Read/Write

Description: This count register is used to determine the number of words (32 bits) to transfer from channel 0 to the incrementing addresses generated by the inbound memory base address register. The count register is decremented after each use. Channel 0 will behave normally when the count is zero.

Power-On-Reset Value: 'hex 0000'

7.5.17 Outbound Memory Base Address

Use: Used to bypass the GAM for the generation of addresses by the PMI for data transmission.

Length: 24 bits.

Type: Read/Write

Description: If there is a non-zero count in the Outbound Memory Transfer Count register this register will be used to generate the storage addresses for data which is to be transmitted on channel 0. The value of the register will be incremented after each use.

Power-On-Reset Value: 'hex 00 0000'

7.5.18 Outbound Memory Transfer Count

Use: Used to bypass the GAM for the generation of addresses by the PMI for data transmission.

Length: 16 bits.

Type: Read/Write

Description: This count register is used to determine the number of words (32 bits) to transfer from the incrementing addresses generated by the outbound memory base address register to channel 0. The count register is decremented after each use. Channel 0 will behave normally when the count is zero.

Power-On-Reset Value: 'hex 0000'

7.6 PMI Error and Reset actions

These actions have been described in the preceding text. On Power On Reset (POR) the ID registers will be reloaded.

On errors, bus cycles will be aborted, and communications front end activities will be aborted. The P will need to restart the PMI by clearing the BERROR bit. The communications front end register interface will remain active. This will allow a processor on the other side of the PMI to reset the PMI and allows for the possibility of Network IPLing.

8.0 Processor Subsystem

In one implementation, the processor subsystem (p) in the generic high bandwidth adapter is built around Intel's 80386 processor. The 80386 is a 32-bit high-performance processor incorporating multitasking support, memory management, pipelined architecture, address translation caches, and a high-speed bus interface. It can access up to four gigabytes of physical memory (32 address lines).

Apart from the 80386, the implemented Processor Subsystem consists of the following elements:

Local RAM and RAM Controller
ROS/EEROS
p Auxiliary Logic
Generic Adapter Bus Isolator
GAM Local Bus Isolator

8.1 Local RAM & RAM Controller

The processor local RAM provides the storage for the P operating system software, the communication code, and the code immediate control data. The local RAM can be implemented in either static RAM (SRAM) or Dynamic RAM (DRAM). If the local RAM is implemented in SRAM, no major function needs to be perform by the RAM controller. On the other hand, if DRAM is used, the RAM controller needs to perform the following functions:

Dynamic Memory Refresh;
ECC Generation/Correction/Checking;
Row Address and Column Address Control Selection;
P Instruction Cache Buffer (if required);

The local RAM size shall be determined based on the adapter configuration and code storage requirements.

8.2 ROS/EEROS

When the generic high bandwidth adapter is powered on, the P in the adapter will start the power-on procedure. This power-on procedure is a series of processes, which will eventually bring the adapter from the "power-on" state to either the "operating" state, if no hardware error is detected, or the "error recovery" state, if one or more hardware errors are detected. The adapter power-on procedure may include the following processes:

perform the power on self test;
initialize the P subsystem;
initialize the PM;
initialize the GAM;
initialize the PMIs and the adapter ports;
establish the connections with attached hosts;
establish the connections with attached network servers;
report the adapter configuration;
initiate the adapter operating code load;
initialize the adapter operating code;
report the detected adapter errors (if any);

All the P code essential to the adapter power-on procedure has to be stored in the nonvolatile memory, i.e. ROS or EEROS. In addition, the ROS/EEROS can also be used to store the basic adapter vital information such as the 48-Bit LAN address, the adapter part number, and the adapter serial number.

The actual size of this nonvolatile storage can vary for different adapter initialization requirements. However, the ROS/EEROS has to be located at the highest P address space because, during the power-on reset, the 386 will start its execution from address HEX 'FFFFFFF0'.

8.3 P Auxiliary Logic

In addition to the local RAM and ROS/EEROS, the P needs to have the following auxiliary circuits to support its operating requirements:

Software Programmable Timer

There are two software programmable timers which need to be supported in the P auxiliary logic and they are:

Software Timer Tick

This timer tick is the basic time unit used by the adapter operating system code to schedule tasks and provide the timer services to the communication code. The tick interval is programmable by the adapter operating system code and when the timer expires, a maskable interrupt will be generated to the P and the timer will, then, automatically restart itself.

This timer shall be able to support the granularity of one hundred u-seconds. During power-on reset, this timer is set to zero and shall not generate any interrupt until it is first initialized by the adapter code.

Software Watchdog Timer

This timer is programmable by the P and it shall be set to a predefined value during the adapter power-on procedure. This timer is expected to be periodically reset by the P code before it expires. If this timer expires, a nonmaskable interrupt will be generated to the P to release the code from a possible hang condition.

This timer shall be able to support the granularity of one m-second. During the power-on reset, this timer is set to zero and shall not generate any interrupt until it is first initialized by the adapter code.

Hardware Watchdog Timer

The hardware watchdog timer is intended to release the adapter from a possible hang condition. This watchdog timer starts when the 386 –ADS (address status) signal becomes active and stops when the 386 –READY signal becomes active. When there is an adapter hardware error or when the adapter code tries to address a nonexisting location, the –READY signal will never become active and this hardware watch dog timer will expire. When the timer expires, a nonmaskable interrupt will be generated to the P immediately. The timer granularity for the hardware watchdog timer shall be on the order of one u-second. This timer shall be implemented with a programmable interval. During power-on reset, this timer shall default to a fixed interval and it can be changed later on by the adapter code. The typical order of magnitude for this timer shall be ten u-seconds.

Universal Time Clock

In addition to all of the timer support mentioned above, there is also a need for a universal timer clock with one u-second granularity. In the P auxiliary circuit, there will be a 32-bit clock counter. This clock counter, which can be readable and writeable by the P, increases by one for each u-second. When the clock counter reaches the value of 3600 million u-seconds, it will be reset to zero automatically. When the clock counter resets itself, it will cause another counter (hour counter) in the P auxiliary circuit to increase by one. The clock counter and hour counter can be used by the P to generate the universal time stamp for applications such as performance evaluation, event trace, program trace and packet trace.

Interrupt Controller

The P interrupt controller has to support the following interrupt sources:

Software Timer Tick Interrupt

Software Watchdog Timer Interrupt

Hardware Watchdog Timer Interrupt

PMI0-PMIN-1 Event Interrupt (GAB signals: –INT0 to –INTN-1)

PMI0-PMI3 Respond Valid Interrupt (GAB signals: –RV0 to –RVN-1)

GAM Input Packet Threshold Interrupt (GAB signal: –INTN)

Free Buffer Below Interrupt (GAB signal: BELOW)

Asynchronous Buffer Above Interrupt (GAB signal: ABABV)

Event FIFO Half Full Interrupt (GAB signal: EF_HF)

Queues Status Register Change Interrupt with matched Queue Address (GAB signals: QSRC, QA0 to QA2)

One-bit Packet Memory ECC Error Interrupt (GAB signal: –INTN+1)

One-bit P Local Memory ECC Error Interrupt

Double-bit P Local Memory ECC Error Interrupt

In addition, the P interrupt controller shall also support the following operating requirements:

Interrupt Status Register—a 32-bit interrupt status register to indicate which interrupt sources were activated when the interrupt was generated; this register shall be readable by the P and the P shall also be able to clear this register by writing '0' to it;

Programmable Interrupt Priority—the interrupt controller shall be able to allow the P to program the priority of each interrupt source;

Programmable Interrupt Mask—the P shall also be allowed to have the capability to mask any interrupt below a certain priority if it selects to;

Programmable Interrupt Source Format—some interrupt sources are active high and some are active low; some interrupt sources are edge-sensitive and some are level sensitive; the interrupt controller shall be able to support these 4 different combinations of interrupt formats and also allow the P to individually select the format for each interrupt source;

P Address Decoder

The function performed by the P address decoder is to decode the P access request and generate the appropriate control signals to the target slaves.

Parity Generation

For any GAB access from the P, odd parity has to be generated on the address bus. If the access is a write operation odd parity also has to be generated on the data bus. If the access is a read operation, no data parity will be generated. Parity will be checked by the bus monitor (GAM). If a parity error is detected, the bus monitor will generate a bus error and any ongoing process will be aborted immediately (refer to section 8.4, GAB Isolator for details).

8.4 GAB Isolator

The P GAB isolator not only provides signal isolation between the 386 local bus and the GAB but also provides the following functions:

PM Cache Buffer Controller

To reduce the GAB contention and to speed up the P packet header processing, one or more 32-byte bank of snooping cache buffer is needed. This snooping cache buffer works as follows:

1. When the P makes the first read request to the packet memory, the cache buffer controller, in turn, makes a burst of read requests to packet memory until either 32 bytes of data are read from the packet memory or the address of the read request reaches a 32-byte boundary. The data read from the packet memory will, then, be stored in the cache buffer.

2. From then on, every time when the P makes a packet memory access request, the cache buffer controller will check the access address to see if there is a cache hit. If there is a cache hit and the access request is a read request, the controller will return the data stored in the cache buffer to the P immediately. If there is a cache hit and the request is a write operation, the controller will write the new data into the cache buffer and mark the cache as "dirty." On the other hand, if the P access request causes a cache miss, the controller will first check if the cache buffer is "dirty." If the cache buffer is "dirty," the controller will write all the data in the cache buffer back to the packet memory before it flushes the cache buffer and starts a new cache cycle.

GAB Bus Error Handler

As mentioned in chapter 4.0, Generic Adapter Manager (GAM), a GAB bus error can happen at any time when:

there is a bus parity error;

the number of bus cycles per bus mastership exceeds the limit;

other conditions determined by the specific implementation;

When a bus error signal is asserted, the GAM and all the PMIs in the adapter will immediately abort any ongoing processing. The bus error handler shall also generate a nonmaskable interrupt to the P. When the GAB bus error interrupt is received by the P, the P shall abandon its packet processing immediately, report the error to the host, and start the error recovery procedure (if required by the implementation).

8.5 GAM Local Bus Isolator

There are two functions performed by the P GAM local bus isolator and they are:

signal isolation between 386 local bus and the GAM local bus

GAM local bus contention arbitration

While several embodiments and variations of the present invention for a generic high bandwidth adapter architecture are described in detail herein, it should be apparent that the disclosure and teachings of the present invention will suggest many alternative designs to those skilled in the art.

Having thus described our invention, what we claim as new, and desire to secure by Letters Patent is:

1. A generic high bandwidth adapter for a plurality of users of communication services, such as a plurality of communication networks or computer buses, comprising:
   a. a generic adapter manager means, including a logic means for preparing future responses to anticipated requests for communication services, a generic adapter manager memory for storing the prepared future responses at specified addresses in the memory, and a generic adapter manager bus for carrying the requests for communication services, and responses to the requests for communication services;
   b. a packet memory means for storing packet data in buffers;
   c. a plurality of users of communication services, such as a plurality of communication networks or computer buses, with each user including a packet memory interface for sending a current request for communication services to the generic adapter manager means, such as a request for the receipt of data, a request for the transmission of data, and a request for a next buffer, and wherein each user of communication services sends a current request for communication services by executing a memory read operation which reads the prepared response at a specified address in the generic adapter manager memory;
   d. said generic adapter manager means prepares future responses to anticipated requests for communication services, with the future responses being functions of the current requests for communication services, such as preparing a response for an anticipated request for a next buffer by a current request for a receipt of data, and storing the future responses at specified addresses in memory concurrently with the transmission of current responses to the users of communication services;
   e. a generic adapter bus for connecting together said packet memory means, said generic adapter manager means, and the packet memory interfaces; and
   f. wherein said packet memory means includes a packet memory controller for interfacing with said generic adapter bus, and for isolating the packet memory means from requirements of the generic adapter bus such as parity generation and operations of reading data from and writing data into the packet memory means.

2. A generic high bandwidth adapter as claimed in claim 1, wherein each user of communication services includes a packet memory interface for interfacing with the generic adapter bus.

3. A generic high bandwidth adapter as claimed in claim 1, wherein said logic means comprises foreground logic and background logic, and the background logic operates to stay a step ahead of received requests for communication services by preparing a next free buffer pointer and a next free packet pointer and stores the two pointers in a register, which is accessible to the foreground logic to generate a timely response to a current request by a packet memory interface.

4. A generic high bandwidth adapter as claimed in claim 1, wherein each user of communication services executes a memory read operation, which reads a response at a specified address in the generic adapter manager memory, in one synchronous bus cycle.

5. A generic high bandwidth adapter as claimed in claim 1, wherein data is carried by data packets of variable lengths, with each data packet including a header control information portion required by communication protocols and used to mediate an information exchange, and a data portion for the data which is to be communicated.

6. A generic high bandwidth adapter as claimed in claim 1, wherein the packet memory means is organized as a three level hierarchy comprising a first level of queue sets, each of which is comprised of a second level of linked lists of data packets, with each data packet being comprised of a third level list of buffers, said packet memory means storing data packets arriving at least one packet memory interface, with each data packet being stored in one or more of said buffers as required by the length of the data packet, with the order of use of the buffers being interchangeable.

7. A generic high bandwidth adapter as claimed in claim 1, wherein the generic adapter manager means performs and synchronizes generic adapter management functions, including implementing data structures in said packet memory means by organizing data packets in said buffers, and organizing data packets into queues for processing or transfer to or from a packet memory interface, and processing multiple interleaved receive data streams and multiple interleaved transmit data streams.

8. A generic high bandwidth adapter as claimed in claim 1, wherein each packet memory interface provides for transfer of data packets into and out of said packet memory means, such that when a data packet is received at a packet memory interface, the data packet is transferred into said packet memory means and queued for processing.

9. A generic high bandwidth adapter as claimed in claim 1, wherein said generic adapter bus is synchronously operated.

10. A generic high bandwidth adapter as claimed in claim 1, wherein the memory of the generic adapter manager means stores data structures used to organize data packets in said buffers and data packets into queues, and a local bus coupled to said generic adapter manager memory means.

11. A generic high bandwidth adapter as claimed in claim 1, wherein each packet memory interface provides for obtaining buffers from said generic adapter manager means for storing arriving data packets in said packet memory means, and also for reading out data packets from said packet memory means and passing the data packets from said packet memory means to a packet memory interface.

12. A generic high bandwidth adapter as claimed in claim 1, wherein said generic adapter manager means organizes queues, with each queue comprising a linked list of data packets having a given priority level and destined for the same packet memory interface, or to be processed in a similar manner.

13. A generic high bandwidth adapter as claimed in claim 1, wherein each packet memory interface includes means for examining the contents of incoming data packets and determining the proper queue to which the data packet should be enqueued.

14. A generic high bandwidth adapter as claimed in claim 1, providing a unified architecture for data communications between buses, channels, processors, switch fabrics and/or communication networks.

15. A generic high bandwidth adapter for a plurality of users of communication services, such as a plurality of communication networks or computer buses, comprising:

a. a generic adapter manager means, including a logic means for preparing future responses to anticipated requests for communication services, a generic adapter manager memory for storing the prepared future responses at specified addresses in the memory, and a generic adapter manager bus for carrying the requests for communication services, and responses to the requests for communication services;

b. a packet memory means for storing packet data;

c. a plurality of users of communication services, such as a plurality of communication networks or computer buses, with each user including a packet memory interface for sending a current request for communication services to the generic adapter manager means, such as a request for the receipt of data, a request for the transmission of data, and a request for a next buffer, and wherein each user of communication services sends a current request for communication services by executing a memory read operation which reads the prepared response at a specified address in the generic adapter manager memory;

d. said generic adapter manager means prepares future responses to anticipated requests for communication services, with the future responses being functions of the current requests for communication services, such as preparing a response for an anticipated request for a next buffer by a current request for a receipt of data, and storing the future responses at specified addresses in memory concurrently with the transmission of current responses to the users of communication services;

e. a generic adapter bus for connecting together said packet memory means, said generic adapter manager means, and the packet memory interfaces; and f. wherein a status notification arrangement is used to notify each said packet memory interface of the existence of data packets in at least one of the queues forming their respective transmit queue sets and comprising a status register, wherein each bit therein corresponds to a queue and indicates whether that queue is empty, with a state change of the status register being broadest to all packet memory interfaces over said generic adapter bus.

16. A generic high bandwidth adapter for a plurality of users of communication services, such as a plurality of communication networks or computer buses, comprising:

a. a generic adapter manager means, including a logic means for preparing future responses to anticipated requests for communication services, a generic adapter manager memory for storing the prepared future responses at specified addresses in the memory, and a generic adapter manager bus for carrying the requests for communication services;

b. a packet memory means for storing packet data;

c. a plurality of users of communication services, such as a plurality of communication networks or computer buses, with each user including a packet memory interface for sending a current request for communication services to the generic adapter manager means, such as a request for the receipt of data, a request for the transmission of data, and a request for a next buffer, and wherein each packet memory interface includes speed matching staging buffers to allow the transmission of data at different transmission rates, and wherein each user of communication services sends a current request for communication services by executing a memory read operation which reads the prepared response at a specified address in the generic adapter manager memory; and d. said generic adapter manager means prepares future responses to anticipated requests for communication services, with the future responses being functions of the current requests for communication services, such as preparing a response for an anticipated request for a next buffer by a current request for a receipt of data, and storing the future responses at specified addresses in memory concurrently with the transmission of current responses to the users of communication services.

17. A generic high bandwidth adapter for a plurality of users of communication services, such as a plurality of communication networks or computer buses, comprising:

a. a generic adapter manager means, including a logic means for preparing future responses to anticipated requests for communication services, a generic adapter manager memory for storing the prepared future responses at specified addresses in the memory, and a generic adapter manager bus for carrying the requests for communication services, and responses to the requests for communication services;

b. a packet memory means for storing packet data;

c. a plurality of users of communication services, such as a plurality of communication networks or computer buses, with each user including a packet memory interface for sending a current request for communication services to the generic adapter manager means, such as a request for the receipt of data, a request for the transmission of data, and a request for a next buffer, and wherein each user of communication services sends a current request for communication services by executing a memory read operation which reads the prepared response at a specified address in the generic adapter manager memory;

d. said generic adapter manager means prepares future responses to anticipated requests for communication services, with the future responses being functions of the current requests for communication services, such as preparing a response for an anticipated request for a next buffer by a current request for a receipt of data, and storing the future responses at specified addresses in memory concurrently with the transmission of current responses to the users of communication services; and e. wherein said generic adapter manager means defines a queue set for each packet memory interface comprising a group of queues which can be treated collectively as one operand for a given queue set operation.

18. A generic high bandwidth adapter for a plurality of users of communication services, such as a plurality of communication networks or computer buses, comprising:

a. a generic adapter manager means, including a logic means for preparing future responses to anticipated requests for communication services, a generic adapter manager memory for storing the prepared future responses at specified addresses in the memory, and a generic adapter manager bus for carrying the requests for communication services, and responses to the requests for communication services;

b. a packet memory means for storing packet data in buffers, wherein the packet memory means is organized as a three level hierarchy comprising a first level of queue sets, each of which is comprised of a second level of linked lists of data packets, with each data packet being comprised of a third level list of buffers, and wherein said buffers can be linked to more than one data packet, as when attaching identical header control information portions to several data packets;

c. a plurality of users of communication services, such as a plurality of communication networks or computer buses, with each user including a packet memory interface for sending a current request for communication services to the generic adapter manager means, such as a request for the receipt of data, a request for the transmission of data, and a request for a next buffer, and wherein each user of communication services sends a current request for communication services by executing a memory read operation which reads the prepared response at a specified address in the generic adapter manager memory; and d. said generic adapter manager means prepares future responses to anticipated requests for communication services, with the future responses being functions of the current requests for communication services, such as preparing a response for an anticipated request for a next buffer by a current request for a receipt of data, and storing the future responses at specified addresses in memory concurrently with the transmission of current responses to the users of communication services.

19. A generic high bandwidth adapter for a plurality of users of communication services, such as a plurality of communication networks or computer buses, comprising:

a. a generic adapter manager means, including a logic means for preparing future responses to anticipated requests for communication services, a generic adapter manager memory for storing the prepared future responses at specified addresses in the memory, and a generic adapter manager bus for carrying the requests for communication services, and responses to the requests for communication services;

b. a packet memory means for storing packet data in buffers, wherein the packet memory means is organized as a three level hierarchy comprising a first level of queue sets, each of which is comprised of a second level of linked lists of data packets, with each data packet being comprised of a third level list of buffers, and the data portions of the data packets can be linked to different header control information portions, without duplicating or erasing the data portions until the last data packet using a data portion is transmitted;

c. a plurality of users of communication services, such as a plurality of communication networks or computer buses, with each user including a packet memory interface for sending a current request for communication services to the generic adapter manager means, such as a request for the receipt of data, a request for the transmission of data, and a request for a next buffer, and wherein each user of communication services sends a current request for communication services by executing a memory read operation which reads the prepared response at a specified address in the generic adapter manager memory; and d. said generic adapter manager means prepares future responses to anticipated requests for communication services, with the future responses being functions of the current requests for communication services, such as preparing a response for an anticipated request for a next buffer by a current request for a receipt of data, and storing the future responses at specified addresses in memory concurrently with the transmission of current responses to the users of communication services.

* * * * *